(12) United States Patent
Noh et al.

(10) Patent No.: US 11,582,004 B2
(45) Date of Patent: Feb. 14, 2023

(54) METHOD AND APPARATUS FOR REPORTING CHANNEL STATE INFORMATION IN WIRELESS COMMUNICATION SYSTEMS

(71) Applicant: Samsung Electronics Co., Ltd., Suwon-si (KR)

(72) Inventors: Hoondong Noh, Suwon-si (KR); Jinyoung Oh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/656,841

(22) Filed: Mar. 28, 2022

(65) Prior Publication Data

US 2022/0224476 A1 Jul. 14, 2022

Related U.S. Application Data

(63) Continuation of application No. 16/993,174, filed on Aug. 13, 2020, now Pat. No. 11,290,235.

(30) Foreign Application Priority Data

Aug. 13, 2019 (KR) .................. 10-2019-0098928

(51) Int. Cl.
*H04W 24/10* (2009.01)
*H04L 5/00* (2006.01)
(Continued)

(52) U.S. Cl.
CPC .......... *H04L 5/0048* (2013.01); *G06F 9/4887* (2013.01); *H04B 7/0626* (2013.01); *H04W 24/10* (2013.01); *H04W 72/042* (2013.01)

(58) Field of Classification Search
CPC .... H04B 7/0626; H04B 7/024; H04B 7/0695; H04B 17/309; H04B 7/0456;
(Continued)

(56) References Cited

U.S. PATENT DOCUMENTS 10,560,859 B2 2/2020 Li et al.
2012/0243634 A1 9/2012 Seller
(Continued)

OTHER PUBLICATIONS

LG Electronics, "Physical layer design of DL signals and channels for NR-U", 3GPP TSG RAN WG1 #97, May 13-17, 2019, R1-1906673, 9 pages.
(Continued)

*Primary Examiner* — Eva Y Puente

(57) ABSTRACT

A method performed by a terminal in a wireless communication system includes: receiving, from a base station, configuration information associated with a channel state information (CSI) report including at least one information associated with a CSI resource setting; receiving, from the base station, information associated with channel occupancy duration; determining whether at least one symbol for receiving a channel state information reference signal (CSI-RS) is within channel occupancy duration, based on the at least one information associated with the CSI resource setting and the received information associated with the channel occupancy duration; receiving, from the base station, at least one CSI-RS on the at least one symbol, based on a result of the determining; and when the CSI report is determined to be transmitted, transmitting; to the base station, the CSI report based on the configuration information associated with the CSI report and the received at least one CSI-RS.

20 Claims, 18 Drawing Sheets

(51) Int. Cl.
*G06F 9/48* (2006.01)
*H04B 7/06* (2006.01)
*H04W 72/04* (2009.01)

(58) Field of Classification Search
CPC .... H04B 7/0639; H04B 7/0632; H04B 17/24; H04W 24/10; H04W 72/042; H04W 72/0413; H04W 72/0453; H04W 72/0446; H04W 72/1289; H04W 80/02; H04L 5/0048; H04L 5/0057; H04L 5/0051; H04L 5/0053; H04L 5/001; H04L 1/0026; H04L 5/0094; H04L 5/0007
USPC ......................................................... 370/329
See application file for complete search history.

(56) References Cited

U.S. PATENT DOCUMENTS

| | | | |
|---|---|---|---|
| 2013/0294351 A1* | 11/2013 | Kwon | H04L 1/0025 370/328 |
| 2016/0156401 A1 | 6/2016 | Onggosanusi et al. | |
| 2016/0301515 A1* | 10/2016 | Ouchi | H04W 72/042 |
| 2016/0365990 A1* | 12/2016 | Yum | H04B 17/309 |
| 2018/0279149 A1 | 9/2018 | Li et al. | |
| 2019/0158216 A1* | 5/2019 | Suzuki | H04W 72/042 |
| 2020/0136882 A1 | 4/2020 | Jo et al. | |
| 2020/0314810 A1 | 10/2020 | Tsai et al. | |
| 2020/0314891 A1 | 10/2020 | Li et al. | |
| 2022/0131584 A1* | 4/2022 | Dalsgaard | H04L 5/0048 |

OTHER PUBLICATIONS

Fraunhofer HHI et al., "Resource Allocation for Mode 1 NR V2X", 3GPP TSG RAN WG1 #97, May 13-17, 2019, R1-1906650, 5 pages.
Sharp, "Downlink structure and procedure for NR-U operation", 3GPP TSG RAN WG1 Meeting #97, May 13-17, 2019, R1-1907210, 8 pages.
Qualcomm, "Guidance on essential functionality for NR-U", 3GPP TSG RAN meeting #84, Jun. 3-6, 2019, RP-191549, 8 pages.
Notification of Transmittal of the International Search Report and the Written Opinion of the International Searching Authority, or the Declaration dated Nov. 20, 2020 in connection with International Patent Application No. PCT/KR2020/010775, 8 pages.
European Patent Office, "Supplementary European Search Report," dated Jul. 11, 2022, in connection with European Patent Application No. 20852690.5, 11 pages.
Intellectual Property India, "Examination report under sections 12&13 of the Patents Act," dated Jul. 14, 2022, in connection with Indian Patent Application No. 202247009044, 6 pages.
Etri, "CSI measurement and report for LAA," R1-154392, 3GPP TSG RAN WG1 Meeting #82, Beijing, China, Aug. 24-28, 2015, 5 pages.
Ericsson et al., "Corrections and clarifications for CSI reporting," R1-1806216, 3GPP TSG-RAN WG1 Meeting #93, Busan, Korea, May 21-25, 2018, 19 pages.

* cited by examiner

METHOD AND APPARATUS FOR REPORTING CHANNEL STATE INFORMATION IN WIRELESS COMMUNICATION SYSTEMS

CROSS-REFERENCE TO RELATED APPLICATION

This application is a continuation of application Ser. No. 16/993,174, filed Aug. 13, 2020, now U.S. Pat. No. 11,290,235 issued Mar. 29, 2022, which is based on and claims priority under 35 U.S.C. § 119 to Korean Patent Application No. 10-2019-0098928, filed Aug. 13, 2019, in the Korean Intellectual Property Office, the disclosures of which are incorporated by reference herein in their entirety.

BACKGROUND

1. Field

The disclosure relates to a wireless communication system, and more particularly, to a method and apparatus for reporting channel state information in a wireless communication system.

2. Description of Related Art

In order to satisfy the soaring demand with respect to wireless data traffic after the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. For higher data transmission rates, implementation of 5G communication systems in ultra-high frequency bands (millimeter wave (mmWave)), such as, e.g., 60 giga-Hertz (GHz), is being considered. In 5G communication systems, beamforming, massive multi-input multi-output (MIMO), full dimensional MIMO (FD-MIMO), array antenna, analog beamforming, and large-scale antenna technologies have been discussed as ways of alleviating propagation path loss of radio waves and increasing propagation distances of radio waves in ultra-high frequency bands. For system network improvement, in 5G communication systems, technologies such as evolved small cell, advanced small cell, cloud radio access network (RAN), ultra-dense network, device to device (D2D) communication, wireless backhaul, moving network, cooperative communication, coordinated multi-points (CoMPs), and interference cancellation have been developed. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, array antennas, and so forth. The application of a cloud RAN as a Big Data processing technology may also be an example of the convergence of 3eG technology and IoT technology.

As described above, various services may be provided as wireless communication systems develop, and accordingly, ways of smoothly providing such services are required. In particular, to provide a service to a user for a longer time, a communication method for saving power of a terminal and a method of reporting channel state information based on the communication method are required.

SUMMARY

The disclosure provides a communication method for saving power of a terminal and a method and apparatus of reporting channel state information based on the communication method in a wireless communication system.

Additional aspects will be set forth in part in the description which follows and, in part, will be apparent from the description, or may be learned by practice of the presented embodiments of the disclosure.

According to an embodiment of the disclosure, a method performed by a terminal in a wireless communication system includes: receiving, from a base station, configuration information associated with a channel state information (CSI) report including at least one information associated with a CSI resource setting; receiving, from the base station, information associated with channel occupancy duration; determining whether at least one symbol for receiving a channel state information reference signal (CSI-RS) is within channel occupancy duration, based on the at least one information associated with the CSI resource setting and the received information associated with the channel occupancy duration; receiving, from the base station, at least one CSI-RS on the at least one symbol, based on a result of the determining; and when the CSI report is determined to be transmitted, transmitting, to the base station, the CSI report based on the configuration information associated with the CSI report and the received at least one CSI-RS.

When the at least one symbol for receiving the CSI-RS is determined to not be within the channel occupancy duration, the at least one CSI-RS may not be received by the terminal on the at least one symbol, and when the at least one symbol for receiving the CSI-RS is determined to be within the channel occupancy duration, the at least one CSI-RS may be received by the terminal based on the at least one symbol.

The method may further include: determining whether an uplink channel for transmitting the CSI report is within the channel occupancy duration based on the configuration information associated with the CSI report and the information associated with channel occupancy duration; and when the uplink channel for transmitting the CSI report is within the channel occupancy duration, determining the CSI report to be transmitted.

The receiving of the at least one CSI-RS on the at least one symbol based on the result of the determining may include: determining that all of symbols for CSI-RS reception are within the channel occupancy duration; and receiving the CSI-RS in which the all of the symbols for CSI-RS reception is within the channel occupancy duration.

The receiving of the at least one CSI-RS on the at least one symbol based on the result of the determining may include: determining that at least one symbol for CSI-RS reception is within the channel occupancy duration; and receiving the CSI-RS in which the at least one symbol for CSI-RS reception is within the channel occupancy duration.

The method may further include determining a CSI processing unit (CPU) occupation time regardless of the channel occupancy duration, wherein the CSI report may be transmitted based on the determined CPU occupation time.

The method may further include: identifying channel non-occupancy duration for the CSI report based on the information associated with channel occupancy duration; determining a most recent CSI-RS before the channel non-occupancy duration for the CSI-report; and determining a CPU occupation time based on the most recent CSI-RS before channel non-occupancy duration for the CSI-report, wherein the CSI report may be transmitted based on the determined CPU occupation time.

The method may further include: identifying channel non-occupancy duration for the CSI report based on the information associated with channel occupancy duration; and determining a most recent CSI-RS before the channel non-occupancy duration for the CSI-report, wherein the CSI report may be transmitted based on the most recent CSI-RS.

According to an embodiment of the disclosure, a method performed by a base station in a wireless communication system includes: transmitting, to the terminal, configuration information associated with a CSI report including at least one information associated with a CSI resource setting; transmitting, to the terminal, information associated with channel occupancy duration; transmitting, to the terminal, at least one CSI-RS; and receiving, from the terminal, a CSI report based on the configuration information associated with the CSI report, wherein the CSI report is transmitted by the terminal based on some of the at least one CSI-RS and the at least one information associated with the CSI resource setting, and wherein some of the at least one CSI-RS include at least one CSI-RS within the channel occupancy duration.

When at least one symbol for transmitting the at least one CSI-RS is determined not to be within the channel occupancy duration, the at least one CSI-RS may not be received by the terminal based on the at least one symbol, and when the at least one symbol for transmitting the at least one CSI-RS is determined to be within the channel occupancy duration, the at least one CSI-RS may be received by the terminal based on the at least one symbol.

According to an embodiment of the disclosure, a terminal in a wireless communication system includes: a transceiver; and at least one processor coupled with the transceiver and configured to: receive, from a base station, configuration information associated with a CSI report including at least one information associated with a CSI resource setting, receive, from the base station, information associated with channel occupancy duration, determine whether at least one symbol for receiving a CSI-RS is within channel occupancy duration, based on the at least one information associated with the CSI resource setting and the received information associated with the channel occupancy duration, receive, from the base station, at least one CSI-RS on the at least one symbol, based on a result of the determining, and when the CSI report is determined to be transmitted, transmit, to the base station, the CSI report based on the configuration information associated with the CSI report and the received at least one CSI-RS.

When the at least one symbol for receiving the CSI-RS is determined to not be within the channel occupancy duration, the at least one CSI-RS may not be received by the terminal based on the at least one symbol, and when the at least one symbol for receiving the CSI-RS is determined to be within the channel occupancy duration, the at least one CSI-RS may be received by the terminal based on the at least one symbol.

The at least one processor may be further configured to: determine whether an uplink channel for transmitting the CSI report is within the channel occupancy duration based on the configuration information associated with the CSI report and the information associated with channel occupancy duration, and when the uplink channel for transmitting the CSI report is within the channel occupancy duration, determine the CSI report to be transmitted.

The at least one processor may be further configured to: determine that all of symbols for CSI-RS reception is within the channel occupancy duration, and receive the CSI-RS in which all of symbols for CSI-RS reception is within the channel occupancy duration.

The at least one processor may be further configured to: determine that at least one symbol for CSI-RS reception is within the channel occupancy duration, and receive the CSI-RS in which the at least one symbol for CSI-RS reception is within the channel occupancy duration.

The at least one processor may be further configured to: determine a CSI processing unit (CPU) occupation time regardless of the channel occupancy duration, wherein the CSI report may b transmitted based on the determined CPU occupation time.

The at least one processor may be further configured to: identify channel non-occupancy duration for the CSI report based on the information associated with channel occupancy duration, determine a most recent CSI-RS before the channel non-occupancy duration for the CSI-report, and determine a CPU occupation time based on the most recent CSI-RS before channel non-occupancy duration for the CSI-report, wherein the CSI report may be transmitted based on the determined CPU occupation time.

The at least one processor may be further configured to: identify channel non-occupancy duration for the CSI report based on the information associated with channel occupancy duration; and determine the most recent CSI-RS before the channel non-occupancy duration for the CSI-report, wherein the CSI report may be transmitted based on the most recent CSI-RS.

According to an embodiment of the disclosure, a base station in a wireless communication system includes: a transceiver; and at least one processor coupled with the transceiver and configured to: transmit, to the terminal, configuration information associated with a CSI report including at least one information associated with a CSI resource setting, transmit, to the terminal, information associated with channel occupancy duration, transmit, to the terminal, at least one CSI-RS, and receive, from the terminal, a CSI report based on the configuration information associated with the CSI report, wherein the CSI report is transmitted by the terminal based on some of the at least one CSI-RS and the at least one information associated with the CSI resource setting, and wherein some of the at least one CSI-RS include at least one CSI-RS within the channel occupancy duration.

When at least one symbol for transmitting the at least one CSI-RS is determined to not be within the channel occupancy duration, the at least one CSI-RS may not be received by the terminal based on the at least one symbol, and when the at least one symbol for transmitting the at least one CSI-RS is determined to be within the channel occupancy duration, the at least one CSI-RS may be received by the terminal based on the at least one symbol.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
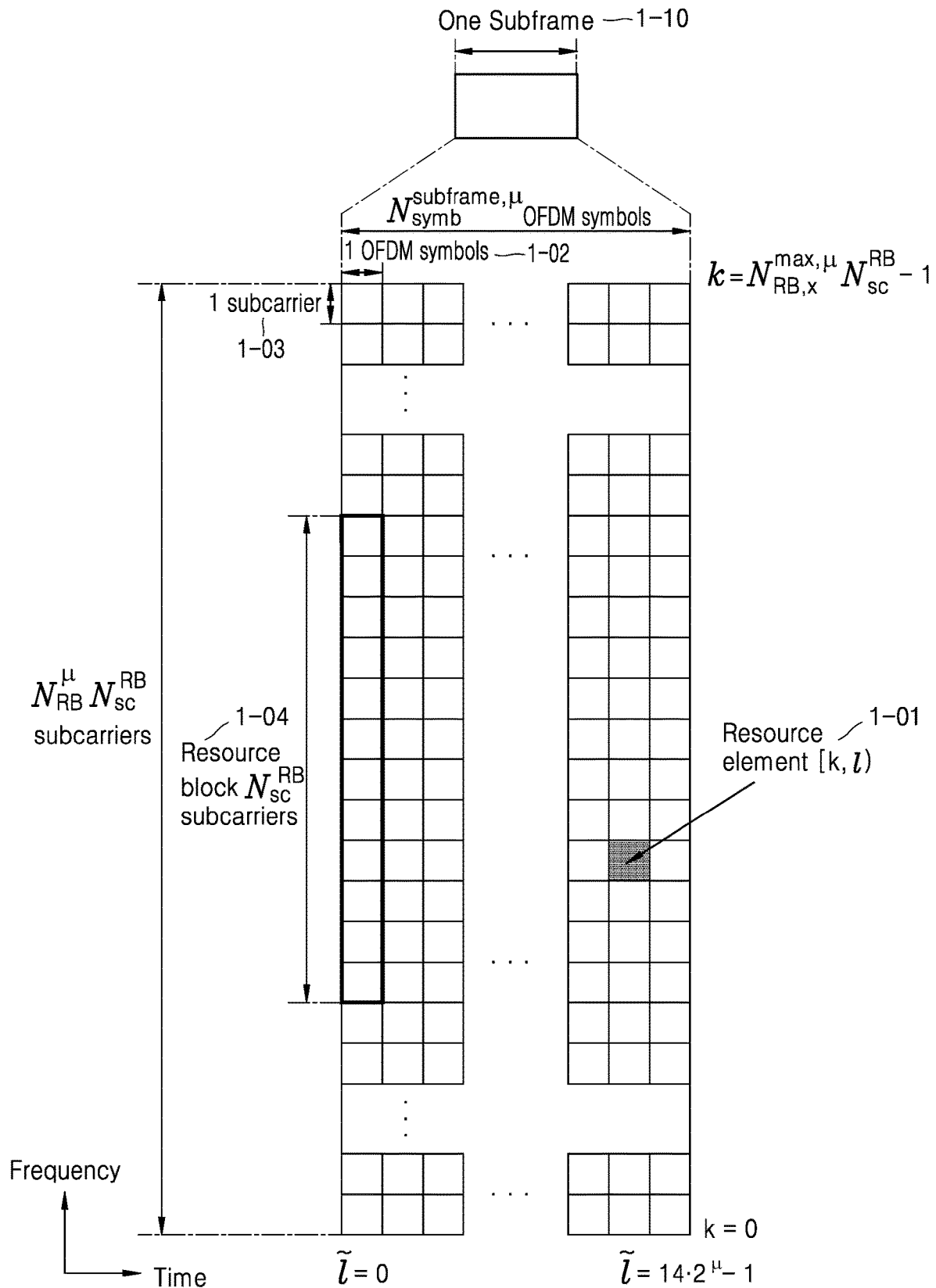
FIG. 1 illustrates a basic structure of a time-frequency domain that is a resource domain of a wireless communication system, according to an embodiment of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

When the embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reason, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments thereof, but may be implemented in various manners, and the embodiments of the disclosure are provided to complete the disclosure of the disclosure and to allow those of ordinary skill in the art to understand the scope of the disclosure, and the disclosure is defined by the category of the claims. Throughout the specification, an identical reference numeral will indicate an identical element.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

The term '—unit' used herein refers to software or a hardware element such as a field-programmable gate array (FPGA), an application specific integrated circuit (ASIC), etc., and 'unit' plays specific roles. However, the meaning of '~unit' is not limited to software or hardware. 'unit' may advantageously be configured to reside on the addressable storage medium and configured to reproduce one or more processors. Thus, according to some embodiments of the disclosure, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '—unit(s)' may be combined into fewer components and '—unit(s)' or further separated into additional components and '—unit(s)'. In addition, components and '—unit(s)' may be implemented to execute one or more CPUs in a device or a secure multimedia card. In some embodiments of the disclosure, 'unit' may include one or more processors.

Hereinafter, the operating principles of the disclosure will be described with reference to the accompanying drawings. In the following description of the disclosure, a detailed description of well-known functions or elements associated with the disclosure will be omitted if it unnecessarily obscures the subject matter of the disclosure. The terms as used herein are defined considering the functions in the disclosure and may be replaced with other terms according to the intention or practice of the user or operator. Therefore, the terms should be defined based on the overall disclosure. Hereinbelow, the base station is an entity that performs resource assignment of the terminal, and may be at least one of gNode B, an evolved Node B (eNode B), Node B, a base station (BS), a wireless access unit, a base station controller, or a node on a network. The terminal may include a UE, an MS, a cellular phone, a smartphone, a computer, or a multimedia system capable of performing communication functions. Needless to say, the disclosure is not limited to the example. Hereinbelow, the disclosure will describe a technique for receiving, by a terminal, broadcast information from a base station in a wireless communication system. The disclosure relates to a communication technique, which is a convergence of the Internet of Things (IoT) technology and $5^{th}$-generation (5G) communication system for supporting higher data transmission rate beyond $4^{th}$-generation (4G) system, and a system for same. The disclosure may be applied to smart services (e.g. smart homes, smart buildings, smart cities, smart cars or connected cars, health care, digital education, retail businesses, security- and safety-related services and the like) on the basis of 5G communication technology and IoT-related technology.

As used below, a term indicating broadcasting information, a term indicating control information, a term related to a communication coverage, a term indicating a state change (e.g., an event), a term indicating network entities, a term indicating messages, a term indicating a component of an apparatus, etc., will be presented for convenience of a description. Therefore, the disclosure is not limited by the following terms, and other terms having equivalent technical meanings may be used.

Hereinbelow, for convenience of a description, the disclosure may employ terms and names defined in the $3^{rd}$-Generation Partnership Project Long Term Evolution (3GPP LTE) standards. However, the disclosure is not limited by such terms and names, and may be equally applied to systems complying with other standards.

A wireless communication system has evolved from an initial one that provides a voice-oriented service to a broadband wireless communication system that provides a high-speed and high-quality packet data service, like the communication standards, such as 3GPP high speed packet access (HSPA), LTE or Evolved Universal Terrestrial Radio Access (E-UTRA), LTE-Advanced (LTE-A), LTE-Pro, 3GPP2 high rate packet data (HRPD), Ultra Mobile Broadband (UMB), the Institute of Electrical and Electronics Engineers (IEEE) 802.16e, etc.

In an LTE system as a representative example of a broadband wireless communication system, orthogonal frequency division multiplexing (OFDM) is employed in a DL and single carrier frequency division multiple access (SC-FDMA) is employed in an UL. The UL means a radio link through which a UE transmits data or a control signal to a base station (eNodeB or BS), and the DL means a radio link through which the base station transmits data or a control signal to the UE. The above-described multiple access scheme separates data or control information for each user by allocating and operating time-frequency resources on which the data or the control information is carried for each user, so that the time-frequency resources do not overlap with each other, that is, so that orthogonality is realized.

A 5G communication system, that is, a post-LTE communication system, needs to freely reflect various requirements from a user and a service provider, such that a service satisfying the various requirements has to be supported. Services taken into consideration for the 5G communication system may include enhanced mobile broadband (eMBB) communication, massive machine type communication (mMTC), ultra reliability low latency communication (URLLC), etc.

According to some embodiments of the disclosure, the eMBB may aim to provide a further enhanced data transmission speed than a data transmission speed supported by existing LTE, LTE-A, or LTE-Pro. For example, in the 5G communication system, with respect to one BS, the eMBB needs to provide a peak data rate of 20 Gbps in the DL and a peak data rate of 10 Gbps in the UL. Furthermore, the 5G or NR communication system should be able to provide an increased user-perceived data rate. In order to satisfy such a requirement, transmission and reception technologies including a further enhanced MIMO transmission technology need to be improved. Moreover, by using a frequency bandwidth wider than 20 MHz in a frequency band of 3 to 6 GHz or more instead of a band of 2 GHz used in the current LTE, the data rates required for the 5G communication system may be satisfied.

At the same time, in the 5G communication system, mMTC is taken into consideration in order to support application services, such as IoT. Access by many UEs within a single cell, coverage improvement of a UE, an increased battery time, a reduction in the cost of a UE are required in order for mMTC to efficiently provide for the IoT. The IoT is attached to various sensors and various devices to provide a communication function, and thus should be able to support many UEs (e.g., 1,000,000 UEs/$km^2$) within a cell. Furthermore, a UE supporting mMTC requires wider coverage compared to other services provided by the 5G communication system because there is a high possibility that the UE may be located in a shadow area not covered by a cell, such as the underground of a building. A terminal supporting mMTC needs to be a cheap UE, and requires a very long battery lifetime due to the difficulty of frequently replacing the battery of the UE.

Last, URLLC is a mission-critical cellular-based wireless communication service, and may needs to provide communication having a super-low latency and an ultra reliability as a service used for remote control of robots or machinery, industrial automation, unmanned aerial vehicles, remote health care, emergency alert, etc. For example, services supporting URLLC may require air interface latency to be less than 0.5 millisecond and also a packet error rate of $10^{-5}$ or less. Accordingly, for services supporting URLLC, the 5G communication system needs to provide a transmission time interval (TTI) less than that of other services, and also requires the design for allocating resources in a wide frequency band. However, the above-described mMTC, URLLC, and eMBB are merely examples of different service types, and a service type to which the disclosure is applied is not limited to the foregoing examples.

The services considered in the above-described 5G communication system need to be provided by being integrated based on one framework. That is, for efficient resource management and control, the services may be controlled and transmitted by being integrated into one system, rather than being managed independently.

While embodiments of the disclosure are described by using an LTE, LTE-A, LTE-Pro, or NR system as an example, the embodiments of the disclosure may also be applied to other communication systems having a similar technical background or channel form. Also, the embodiments of the disclosure may also be applied to other communication systems through some modifications within a range that does not largely depart from the scope of the disclosure based on determination of a skilled person.

The disclosure relates to a random access method and apparatus for a plurality of devices in a wireless communication system.

According to the disclosure, when a terminal operates in a power saving mode in a wireless communication system, a method of reporting channel state information may be optimized for the situation, thereby further enhancing a power saving effect.

Hereinafter, a frame structure of a 5G system will be described in more detail with reference to the drawings.

FIG. 1 illustrates a basic structure of a time-frequency domain that is a resource domain of a wireless communication system, according to an embodiment of the disclosure.

Referring to FIG. 1, a horizontal axis represents a time domain, and a vertical axis represents a frequency domain. In the time and frequency domains, a basic unit of a resource is a resource element (RE) 1-01 which may be defined as one orthogonal frequency division multiplexing (OFDM) symbol 1-02 along a time axis and one subcarrier 1-03 along a frequency axis. In the frequency domain, $N_{SC}^{RB}$ (e.g., 12) consecutive REs may constitute one resource block (RB) 1-04. In an embodiment of the disclosure, a plurality of OFDM symbols may constitute one subframe 1-10.

Figure 2:
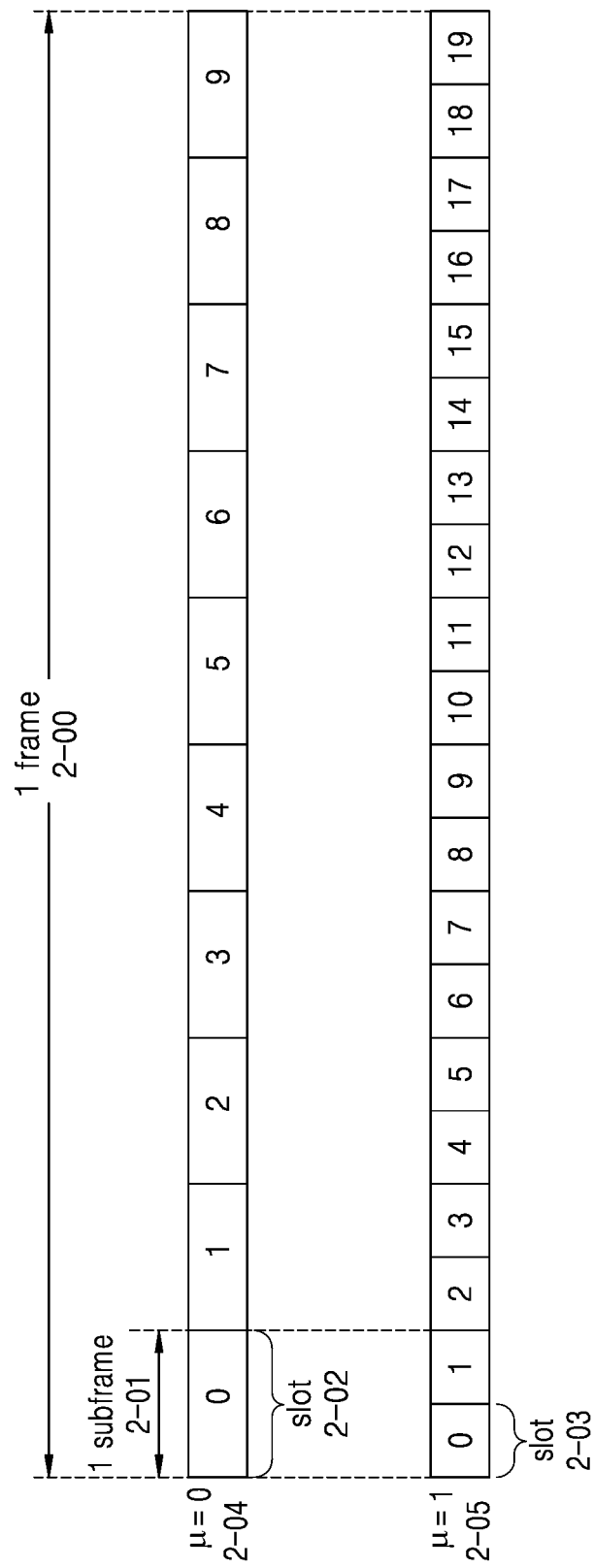
FIG. 2 illustrates a diagram for describing a frame, a sub-frame, and a slot structure of a wireless communication system, according to an embodiment of the disclosure.

FIG. 2 illustrates a diagram for describing a frame, a sub-frame, and a slot structure of a wireless communication system, according to an embodiment of the disclosure.

Referring to FIG. 2, one frame 2-00 may include one or more subframes 2-01, each of which may include one or more slots 2-02. For example, one frame 2-00 may be defined as 10 milliseconds (ms). One subframe 2-01 may be defined as 1 ms, such that one frame 2-00 may include a total of ten subframes 2-01. One slot 2-02 or 2-03 may be defined as fourteen OFDM symbols (i.e., the number of slots per slot ($N_{symb}^{slot}$)=14). One subframe 2-01 may include one slot or a plurality of slots 2-02 and 2-03, and the number of slots 2-02 and 2-03 per subframe 2-01 may vary with set values μ 2-04 and 2-05 for subcarrier spacing. An example of FIG. 2 shows μ=0 2-04 and μ=1 2-05 as the set values for the subcarrier spacing. For μ=0 2-04, one subframe 2-01 may include one slot 2-02, and for μ=1 2-05, one subframe 2-01 may include two slots 2-03. That is, the number of slots per subframe, $N_{slot}^{subframe,\mu}$, may differ with the set value μ for the subcarrier interval, and the number of slots per frame, $N_{slot}^{frame,\mu}$, may vary with the number of slots per subframe. $N_{slot}^{subframe,\mu}$ and $N_{slot}^{frame,\mu}$ based on the set value μ for the subcarrier spacing may be defined as shown in [Table 1].

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include a maximum of 250 RBs or more. Thus, when the terminal receives a serving cell bandwidth at all times like in LTE, much power consumption of the terminal may be accompanied, and to solve this problem, the base station may configure one or more bandwidth parts (BWPs) for the terminal to support the terminal to change a reception region in a cell. In NR, the base station may configure an 'initial BWP', which is a bandwidth of a control region CORESET #0 (or a common search space (CSS)), for the terminal through an MM. Thereafter, the base station may configure a first BWP of the terminal through RRC signaling, and notify at least one BWP configuration information that may be indicated by downlink control information (DCI) in the future. Thereafter, the base station may indicate a band to be used by the terminal, by noticing a BWP ID through the DCI. When the terminal fails to receive DCI in a currently allocated BWP for a certain time or longer, the terminal may return to 'default BWP' and attempt to receive DCI.

Figure 3:
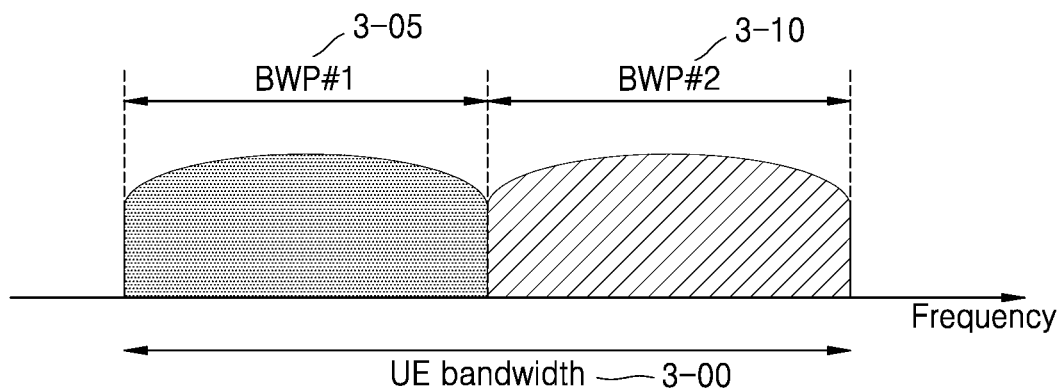
FIG. 3 illustrates a diagram for describing an example of a bandwidth part in a wireless communication system, according to an embodiment of the disclosure.

FIG. 3 illustrates a diagram for describing an example of a bandwidth part in a wireless communication system, according to an embodiment of the disclosure.

Referring to FIG. 3, a UE bandwidth 3-00 may include two BWPs, i.e., BWP #1 3-05 and BWP #2 3-10. The base station may configure one BWP or multiple BWPs for the terminal, and configure information as shown in [Table 2] for each BWP.

TABLE 2

| BWP ::= | SEQUENCE { |
|---|---|
| bwp-Id | BWP-Id, |
| locationAndBandwidth | INTEGER (1..65536), |

TABLE 2-continued

| subcarrierSpacing | ENUMERATED {n0, n1, n2, n3, n4, n5}, |
|---|---|
| cyclicPrefix | ENUMERATED {extended} |
| } | |

However, the disclosure is not limited to the above-described example, and various parameters related to a BWP may be configured to the terminal. The foregoing information may be transmitted from the base station to the terminal through higher layer signaling, e.g., RRC signaling. Among the configured one or multiple BWPs, at least one BWP may be activated. Whether to activate the configured BWP may be transmitted from the base station to the terminal in a semi-static manner through RRC signaling or dynamically through a medium access control (MAC) control element (CE) or DCI.

According to an embodiment of the disclosure, before radio resource control (RRC) connection, a terminal may be configured with an initial BWP for initial connection from the base station through a master information block (MIB). More specifically, the terminal may receive a control region (Control Resource Set, CORESET) in which a PDCCH may be transmitted, and configuration information about a search space in order to receive system information (remaining system information (RMSI) or a system information block 1 (SIB1)) required for initial connection through an NM in the initial connection stage. The control region and the search space that are configured through the MIB may be regarded as an identity (ID) 0, respectively.

The base station may notify the terminal of configuration information such as frequency allocation information, time allocation information, a numerology, etc., for CORESET #0 through the MIR The base station may notify the terminal of configuration information about a monitoring period for CORESET #0 and configuration information for an occasion, i.e., configuration information for search space #0, through the MIB. The terminal may regard a frequency domain configured as CORESET #0 obtained from the MIB as an initial BWP for initial connection. In this case, the ID of the initial BWP may be regarded as 0.

Configuration of a BWP supported in the above-described wireless communication system (5G or NR system) may be used for various purposes.

For example, when a bandwidth supported by the terminal is smaller than a system bandwidth, a bandwidth supported by the terminal may be supported through configuration of a BWP. For example, in [Table 2], as a frequency position (configuration information 2) of a BWP is configured for the terminal, the terminal may transmit and receive data at a certain frequency position in a system bandwidth.

In another example, to support different numerologies, the base station may configure multiple BWPs for the terminal. For example, to support data transmission and reception using both a subcarrier spacing of 15 kilo-Hertz (KHz) and a subcarrier spacing of 30 KHz for a terminal, two BWPs may be configured to use subcarrier spacings of 15 KHz and 30 KHz, respectively. Different BWPs may be subject to frequency division multiplexing (FDM), and a BWP configured by a corresponding to subcarrier spacing may be activated to transmit and receive data with the subcarrier spacing.

In another example, to reduce power consumption of the terminal, the base station may configure BWPs having different bandwidths for the terminal. For example, when the terminal supports a large bandwidth, e.g., a bandwidth of 100 MHz, and transmits and receives data with the bandwidth at all times, much power consumption may be caused. In particular, in the absence of traffic, it may be more inefficient in terms of power consumption for the terminal to perform monitoring with respect to an unnecessary downlink control channel for the large bandwidth of 100 megaHertz (MHz). Thus, to reduce power consumption of the terminal, the base station may configure a BWP of a small bandwidth, e.g., a BWP of 20 MHz for the terminal. In the absence of traffic, the terminal may perform monitoring in the BWP of 20 MHz, and upon generation of data, the terminal may transmit and receive data by using the BWP of 100 MHz according to an indication of the base station.

In the above-described method of configuring a BWP, terminals before RRC connection may receive configuration information regarding an initial BWP through an MIB in the initial connection stage. More specifically, the terminal may be configured with a control region (CORESET) for a downlink control channel in which DCI for scheduling a system information block (SIB) is transmitted through an MIB of a physical broadcast channel (PBCH). The bandwidth of the control region configured through the MIB may be regarded as an initial BWP, and the terminal may receive a PDSCH in which a SIB is transmitted through the configured initial BWP. The initial BWP may be used for other system information (OSI), paging, and random access as well as for reception of the SIB.

Hereinbelow, a synchronization signal (SS)/PBCH block of a wireless communication system (5G or NR system) according to an embodiment of the disclosure will be described.

An SS/PBCH block may mean a physical layer channel block including a primary SS (PSS), a secondary SS (SSS), and a PBCH. More specifically, the SS/PBCH block may be defined as below.

PSS: provides partial information of a cell ID as a signal that is a criterion for downlink time/frequency synchronization.

SSS: is a criterion for downlink time/frequency synchronization and provides the other cell ID information that is not provided by the PSS. Additionally, the SSS serves as a reference signal for demodulation of a PBCH.

PBCH: provides essential system information required for transmission/reception of a data channel and a control channel of a terminal. The essential system information may include search space-related control information indicating radio resource mapping information of a control channel, scheduling control information for a separate data channel that transmits system information.

SS/PBCH block: the SS/PBCH block may include a combination of a PSS, an SSS, and a PBCH. One SS/PBCH block or a plurality of SS/PBCH blocks may be transmitted during 5 ms, and each transmitted SS/PBCH block may be identified by an index.

The terminal may detect the PSS and the SSS and decode the PBCH in the initial connection stage. The terminal may obtain the MIB from the PBCH, and may be configured with CORESET #0 through the MIB. The terminal may perform monitoring with respect to CORESET #0, assuming that the selected SS/PBCH block and a demodulation reference signal (DMRS) transmitted in CORESET #0 are quasi-co-located (QCL). The terminal may receive system information through downlink control information transmitted in CORESET #0. The terminal may obtain random access channel (RACH)-related configuration information required for initial connection from the received system information. The terminal may transmit a physical RACH (PRACH) to the base station based on the selected SS/PBCH index, and the base station having received the PRACH may obtain information about the SS/PBCH block index selected by the terminal. The base station may recognize which block among the SS/PBCH blocks the terminal has selected and that the terminal monitors CORESET #0 corresponding (or related) to the SS/PBCH block selected by the terminal.

Hereinbelow, DCI in a wireless communication system (e.g., a 5G or NR system) will be described in more detail.

In the wireless communication system (e.g., the 5G or NR system), scheduling information for uplink data (or a physical uplink shared channel (PUSCH)) or downlink data (or a physical downlink shared channel (PDSCH)) may be transmitted from the base station to the terminal through the DCI. The terminal may monitor a DCI format for fallback and a DCI format for non-fallback for a PUSCH or a PDSCH. The fallback DCI format may include a fixed field predefined between the base station and the terminal, and the non-fallback DCI format may include a field that may be configured.

The DCI may be transmitted through a physical downlink control channel (PDCCH) through channel coding and modulation. A cyclic redundancy check (CRC) may be added to a DCI message payload, and the CRC may be scrambled by a radio network temporary identifier (RNTI) corresponding to an identity of the terminal. Depending on the purpose of the DCI message, e.g., UE-specific data transmission, power control command, random access response, etc., different RNTIs may be used to scramble a CRC added to a payload of the DCI message. That is, the RNTI may be transmitted by being included in CRC calculation, instead of being explicitly transmitted. Upon reception of the DCI message transmitted on a PDCCH, the terminal may identify the CRC by using the allocated RNTI. When the CRC identification result is right, the terminal may recognize that the message is transmitted to the terminal.

For example, the DCI for scheduling the PDSCH for system information (SI) may be scrambled by an SI-RNTI. The DCI for scheduling the PDSCH for a random access response (RAR) message may be scrambled by an RA-RNTI. The DCI for scheduling the PDSCH for a paging message may be scrambled by a P-RNTI. The DCI for notifying a slot format indicator (SFI) may be scrambled by an SFI-RNTI. The DCI for notifying transmit power control (TPC) may be scrambled by a TPC-RNTI. The DCI for scheduling a terminal-specific PDSCH or PUSCH may be scrambled by a cell (C)-RNTI.

DCI format 0_0 may be used as a fallback DCI for scheduling the PUSCH, and in this case, the CRC may be scrambled by the C-RNTI. In an embodiment of the disclosure, DCI format 0_0 in which the CRC is scrambled by the C-RNTI may include information as shown in [Table 3].

TABLE 3

Identifier for DCI formats - [1] bit
Frequency domain resource assignment - $[[\log_2(N_{RB}^{UL,BWP}(N_{RB}^{UL,BWP} + 1)/2)]]$ bits
Time domain resource assignment - X bits
Frequency hopping flag - 1 bit.

TABLE 3-continued

Modulation and coding scheme - 5 bits
New data indicator - 1 bit
Redundancy version - 2 bits
HARQ process number - 4 bits
TPC command for scheduled PUSCH - [2] bits
UL/SUL, indicator - 0 or 1 bit DCI format 0_1 may be used as a non-fallback DCI for scheduling the PUSCH, and in this case, the CRC may be scrambled by the C-RNTI. In an embodiment of the disclosure, DCI format 0_1 in which the CRC is scrambled by the C-RNTI may include information as shown in [Table 4].

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2 \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1$^{st}$ downlink assignment index - 1 or 2 bits
1 bit for semi-static HARQ-ACK codebook;
2 bits for dynamic HARQ-ACK codebook with single HARQ-ACK codebook.

TABLE 4-continued

2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits SRS resource indicator $- \left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission, $\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as a fallback DCI for scheduling the PDSCH, and in this case, the CRC may be scrambled by the C-RNTI. In an embodiment of the disclosure, DCI format 1_0 in which the CRC is scrambled by the C-RNTI may include information as shown in [Table 5].

TABLE 5

Identifier for DCI formats - [1] bit
Frequency domain resource assignment - $[\lceil \log_2(N_{RB}^{DL,BWP}(N_{RB}^{DL,BWP} + 1)/2 \rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used as a non-fallback DCI for scheduling the PUSCH, and in this case, the CRC may be scrambled by the C-RNTI. In an embodiment of the disclosure, DCI format 1_1 in which the CRC is scrambled by the C-RNTI may include information as shown in [Table 6].

TABLE 6

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP}(N_{RB}^{DL,BWP} + 1)/2) \rceil$ bits
Time domain resource assignment −1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
or transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit FIG. 4 illustrates a diagram for describing a control region (a control resource set (CORESET)) of a downlink control channel of a wireless communication system, according to an embodiment of the disclosure.

Figure 4:
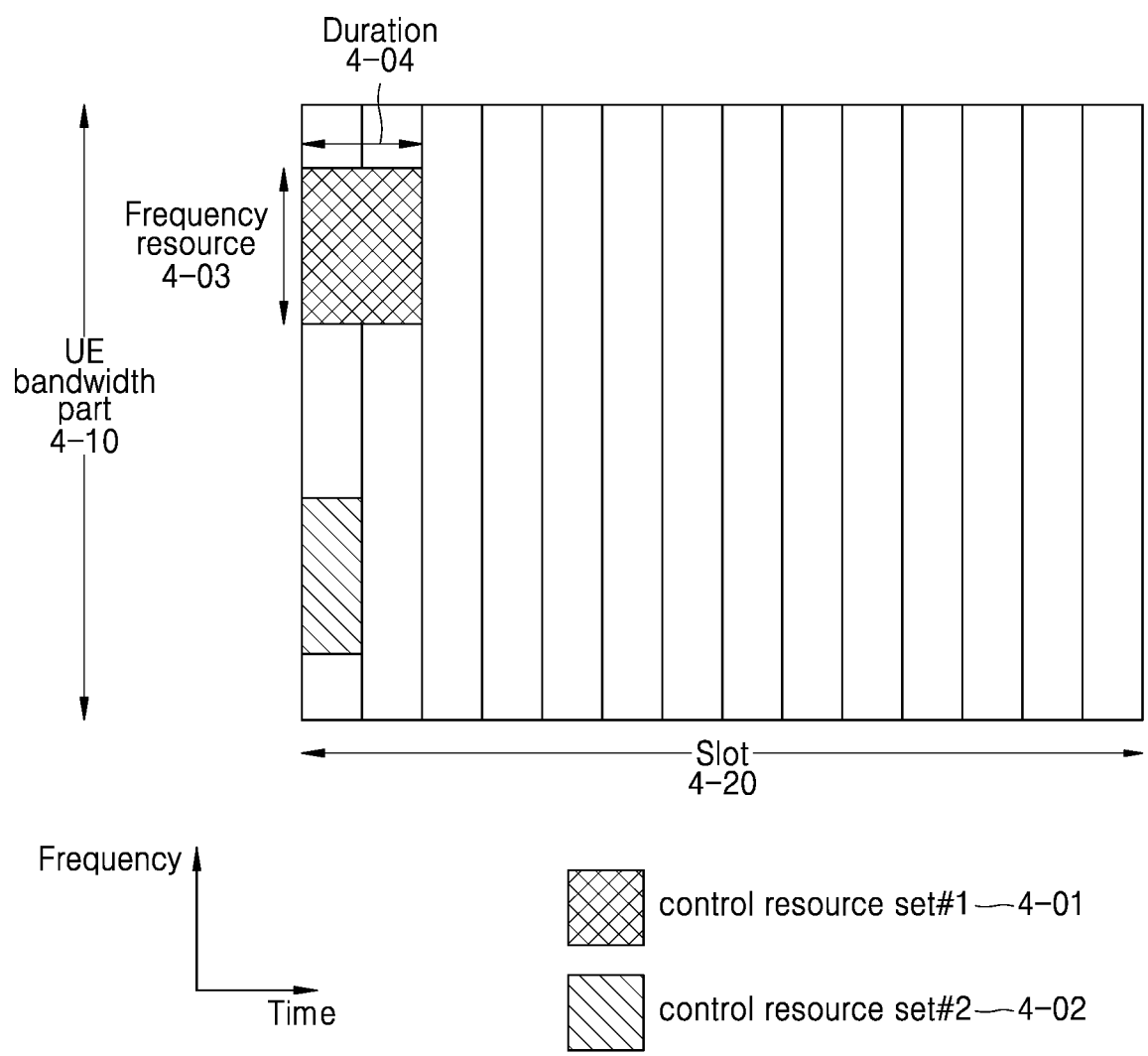
FIG. 4 illustrates a diagram for describing a control region (a control resource set (CORESET)) of a downlink control channel of a wireless communication system, according to an embodiment of the disclosure.

Referring to FIG. 4, it may be seen that two control regions (CORESET #1 4-01 and CORESET #2 4-02) are configured in a terminal bandwidth part 4-10 in a frequency axis and one slot 4-20 in a time axis. The control regions 4-01 and 4-02 may be configured in a particular resource 4-03 in the entire terminal bandwidth part 4-10 in the frequency axis. In the time axis, the control regions 4-01 and 4-02 may be configured with one OFDM symbol or a plurality of OFDM symbols, which may be defined as a CORESET duration 4-04. Referring to FIG. 4, CORESET #1 4-01 may be configured with a CORESET duration of 2 symbols, and CORESET #2 4-02 may be configured with a CORESET duration of 1 symbol.

The control region in the wireless communication system (e.g., the 5G or NR system) may be configured by the BS for the terminal through higher layer signaling (e.g., system information, an MIB, RRC signaling, etc.). Configuring the control region for the terminal may mean providing information such as an ID of a control region, a frequency position of the control region, a symbol length of the control region, etc. For example, configuration of the control region may include information as provided in [Table 7].

TABLE 7

```
ControlResourceSet ::=                SEQUENCE {
    -- Corresponds to L1 parameter 'CORESET-ID'
    controlResoureeSetId              ControlResourceSetId,
    frequencyDomainResources              BIT STRING (SIZE (45)),
    duration                          INTEGER (1..maxCoReSetDuration),
    cce-REG-MappingType                       CHOICE {
        interleaved                       SEQUENCE {
            reg-BundleSize                ENUMERATED {n2, n3, n6},
            preeoderGranularity               ENUMERATED   {sameAsREG-
        bundle, allContiguousRBs},
            interleaverSize               ENUMERATED {n2, n3, n6}
            shiftIndex
                INTEGER(0..maxNrofPhysicalResourceBlocks-1)
            OPTIONAL
    },
        nonInterleaved                    NULL
    },
    tci-StatesPDCCH                       SEQUENCE(SIZE   (1..maxNrofTCI-
        StatesPDCCH)) OF TCI-StateId                 OPTIONAL,
```

TABLE 7-continued

| tci-PresentInDCI | ENUMERATED {enabled} OPTIONAL,  --Need S |

}

In [Table 7], tci-StatesPDCCH (hereinafter, referred to as 'TCI state') configuration information may include information of one or more SS/PBCH block indexes having a QCL relationship with a DMRS transmitted in the corresponding control region or CSI-RS index.

Figure 5:
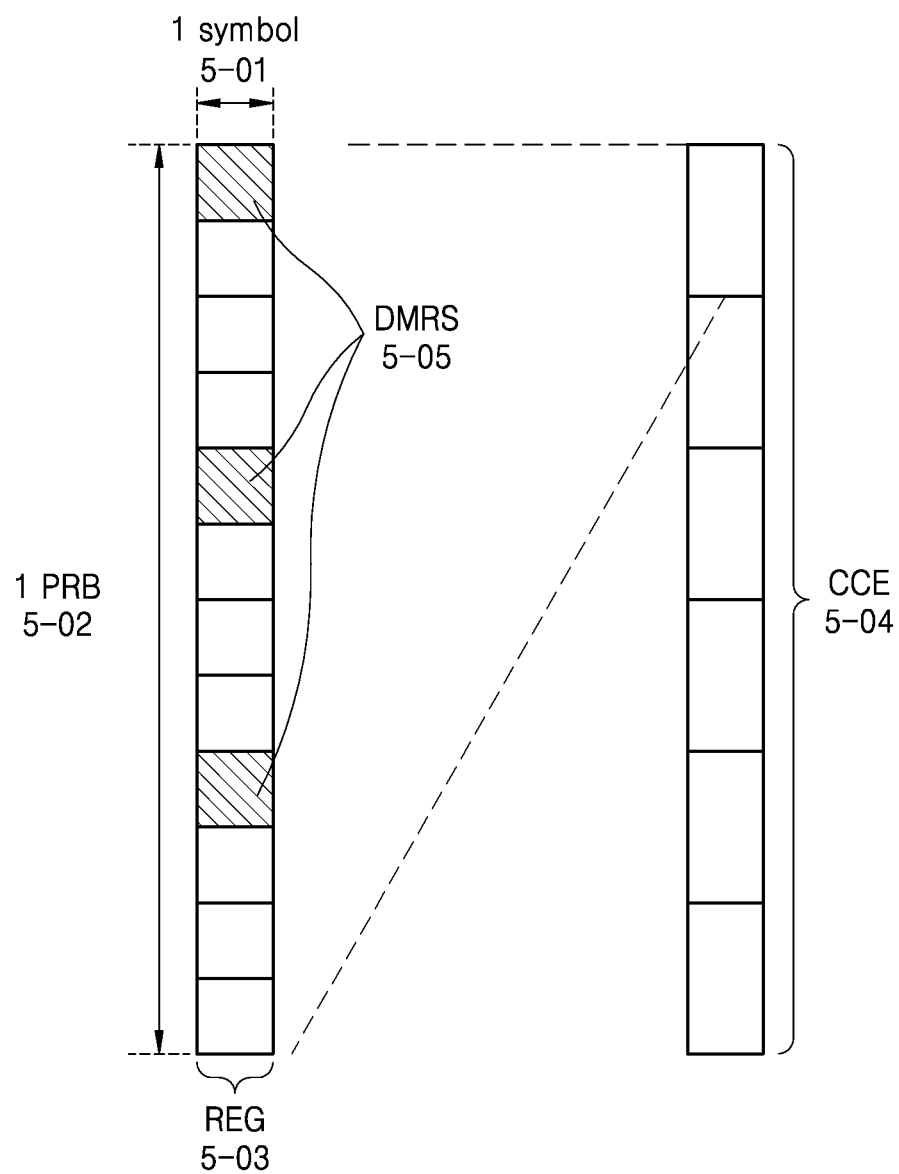
FIG. 5 illustrates a diagram for describing a structure of a downlink control channel of a wireless communication system, according to an embodiment of the disclosure.

FIG. 5 illustrates a diagram for describing a structure of a downlink control channel of a wireless communication system, according to an embodiment of the disclosure.

FIG. 5 shows an example of a basic unit of time and frequency resources that forms a downlink control channel that may be used in 5G system, according to an embodiment of the disclosure.

Referring to FIG. 5, the basic unit of the time and frequency resources that forms the control channel may be defined as a resource element group (REG) 5-03. The REG 5-03 may be defined as 12 subcarriers including one OFDM symbol 5-01 in the time axis and one physical resource block (PRB) 5-02 in the frequency axis. The base station may configure a downlink control channel allocation unit by concatenating the REG 5-03.

As shown in FIG. 5, when it is assumed that the basic unit to which the downlink control channel is allocated is a control channel element (CCE) 5-04 in 5G system, one CCE 5-04 may include a plurality of REGs 5-03. For example, the REG 5-03 shown in FIG. 5 may include 12 REs, and when one CCE 5-04 includes six REGs 5-03, one CCE 5-04 may include 72 REs. When a downlink control region (control resource set) is configured, the downlink control region may include a plurality of CCEs 5-04 and a certain downlink control channel may be transmitted by being mapped to one or more CCEs 504 according to an aggregation level (AL) in the control region. The CCEs 5-04 in the control region (control resource set) may be identified by numbers in which the numbers of the CCEs 5-04 may be given based on a logical mapping scheme.

The basic unit of the downlink control channel shown in FIG. 5, i.e., the REG 5-03 may include both REs to which DCI is mapped and a region to which a DMRS 5-05, which is a reference signal for decoding the REs, is mapped. As shown in FIG. 5, three DMRSs 5-05 may be transmitted in one REG 5-03. The number of CCEs required for transmission of a PDCCH may be 1, 2, 4, 8, and 16 depending on an AL, and different numbers of CCEs may be used to implement link adaptation of a downlink control channel. For example, when AL=L, one downlink control channel may be transmitted through L CCEs.

The terminal needs to detect a signal in a state of being unaware of information about the downlink control channel, and a search space indicating a set of CCEs for blind decoding may be defined. The search space may be a set of downlink control channel candidates including CCEs for which the terminal has to attempt decoding at a given AL. As there may be several ALs forming one group with 1, 2, 4, 8, or 16 CCEs, the terminal may have a plurality of search spaces. A search space set may be defined as a set of search spaces at all the configured ALs.

The search space may be classified into a common search space and a terminal-specific (UE-specific) search space. According to an embodiment of the disclosure, terminals in a particular group or all the terminals may investigate the common search space of the PDCCH in order to receive cell-common control information such as dynamic scheduling for the system information or paging message.

For example, the terminal may investigate the common search space of the PDCCH to receive PDSCH scheduling allocation information for transmission of a SIB including operator information of a cell, etc. For the common search space, terminals in a certain group or all terminals have to receive a PDCCH, such that the common search space may be defined as a set of pre-agreed CCEs. Meanwhile, the terminal may receive scheduling allocation information for the terminal-specific PDSCH or PUSCH by investigating the terminal-specific search space of the PDCCH. The terminal-specific search space may be defined terminal-specifically as a function of the identity of the terminal and various system parameters.

In 5G system, a parameter for a search space for a PDCCH may be set for the terminal by the base station through higher layer signaling (e.g., SIB, MIB, or RRC signaling). For example, the base station may configure for the terminal, the number of PDCCH candidates at each AL L, a monitoring period for the search space, a monitoring occasion in the unit of a symbol in a slot for the search space, a search space type (common search space or terminal-specific search space), a combination of a DCI format to be monitored in the search space and an RNTI, a control region (control resource set) index for monitoring the search space, etc. For example, the foregoing configuration may include information as provided in [Table 8].

TABLE 8

| SearchSpace ::= | SEQUENCE { |
|---|---|
| -- Identity of the search space. SearchSpaceId = 0 identifies the SearchSpace configured via PBCH (MIB) or ServingCellConfigCommon. | |
| searchSpaceId | SearchSpaceId, |
| controlResourceSetId | ControlResoureeSetId, |
| monitoringSlotPeriodicityAndOffset | CHOICE { |
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |

TABLE 8-continued

```
    sl16                    INTEGER (0..15),
    sl20                    INTEGER (0..19)
    }
                        OPTIONAL,
    duration                INTEGER (2..2559)
monitoringSymbolsWithinSlot         BIT STRING (SIZE (14))
                        OPTIONAL
nrofCandidates              SEQUENCE {
    aggregationLevel1           ENUMERATED {n0, n1, n2, n3, n4, n5,
    n6, n8},
    aggregationLevel2           ENUMERATED {n0, n1, n2, n3, n4, n5,
    n6, n8},
    aggregationLevel4           ENUMERATED {n0, n1, n2, n3, n4, n5,
    n6, n8},
    aggregationLevel8           ENUMERATED {n0, n1, n2, n3, n4, n5,
    n6, n8},
    aggregationlevel16          ENUMERATED {n0, n1, n2, n3, n4, n5,
    n6,n8}
},
searchSpaceType             CHOICE {
    -- Configures this search space as common search space (CSS) and DCI formats to
monitor.
    common                  SEQUENCE {
    }
    ue-Specific             SEQUENCE {
    -- Indicates whether the UE monitors in this USS for DCI formats 0-0 and 1-0 or
    for formats 0-1 and 1-1.
    formats                 ENUMERATED {formats0-0-And-1-0,
    formats0-1-And-1-1},
    ...
    }
```

Based on the configuration information, the base station may configure the terminal with one or more search space set. According to an embodiment of the disclosure, the base station may configure the terminal with a search space set 1 and a search space set 2, configure the terminal to monitor a DCI format A scrambled by X-RNTI in the search space set 1 in the common search space, and/or configure the terminal to monitor a DCI format B scrambled by Y-RNTI in the search space set 2 in the terminal-specific search space.

According to the configuration information, one or more search space sets may exist in the common search space or the terminal-specific search space. For example, a search space set #1 and a search space set #2 may be configured as common search spaces, and a search space set #3 and a search space set #4 may be configured as terminal-specific search spaces.

In the common search space, the following combination of the DCI format and the RNTI may be monitored. Needless to say, the disclosure is not limited to the following example.

DCI format 0_0/1_0 with CRC scrambled by C-RNTI, CS-RNTI, SP-CSI-RNTI, RA-RNTI, TC-RNTI, P-RNTI, SI-RNTI
    DCI format 2_0 with CRC scrambled by SFI-RNTI
    DCI format 2_1 with CRC scrambled by INT-RNTI
    DCI format 2_2 with CRC scrambled by TPC-PUSCH-RNTI, TPC-PUCCH-RNTI
    DCI format 2_3 with CRC scrambled by TPC-SRS-RNTI In the terminal-specific search space, a combination of the DCI format and the RNTI may be monitored. Needless to say, the disclosure is not limited to the following example.

DCI format 0_0/1_0 with CRC scrambled by C-RNTI, CS-RNTI, TC-RNTI
    DCI format 0_1/1_1 with CRC scrambled by C-RNTI, CS-RNTI, TC-RNTI The described RNTIs may follow the following definition and purpose.

C-RNTI (Cell RNTI): terminal-specific PDSCH scheduling purpose

TC-RNTI (Temporary Cell RNTI): terminal-specific PDSCH scheduling purpose

CS-RNTI(Configured Scheduling RNTI): for quasi-stationary configured terminal-specific PDSCH scheduling RA-RNTI (Random Access RNTI): for PDSCH scheduling in a random access stage P-RNTI (Paging RNTI): for PDSCH scheduling for transmission of paging SI-RNTI (System Information RNTI): for PDSCH scheduling for transmission of system information INT-RNTI (Interruption RNTI): for notifying puncturing for PDSCH TPC-PUSCH-RNTI (Transmit Power Control for PUSCH RNTI): for indicating a power control command for PUSCH TPC-PUCCH-RNTI (Transmit Power Control for PUCCH RNTI): for indicating a power control command for PUCCH TPC-SRS-RNTI (Transmit Power Control for SRS RNTI): for indicating a power control command for SRS In an embodiment of the disclosure, the foregoing DCI formats may be defined as shown in [Table 9].

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 9-continued

| DCI format | Usage |
| --- | --- |
| 2_2 | Transmission of TPC commands for PUCCH and PUSCH |
| 2_3 | Transmission of a group of TPC commands for SRS transmissions by one or more UEs |

According to an embodiment of the disclosure, in 5G system, a plurality of search space sets may be configured with different parameters (e.g., parameters of [Table 8]). Thus, a group of search space sets monitored by the terminal may vary at every point in time. For example, when the search space set #1 is configured with an X-slot period, the search space set #2 is configured with a Y-slot period, and X and Y are different from each other, the terminal may monitor both the search space set #1 and the search space set #2 in a certain slot and one of them in another certain slot.

When the plurality of search space sets are configured for the terminal, the following conditions may be considered to determine a search space set to be monitored by the terminal.

[Condition 1: Restriction on the Maximum Number of PDCCH Candidates]

the number of PDCCH candidates to be monitored per slot may not exceed MR. MR may be defined as the maximum number of PDCCH candidates per slot in a cell configured with a subcarrier spacing of $15 \cdot 2^\mu$ kHz, as shown in [Table 10].

TABLE 10

| μ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Restriction on a Maximum Number of CCEs]

The number of CCEs constituting the entire search space per slot (herein, the entire search space may refer to the entire CCE set corresponding to a union region of a plurality of search space sets) may not exceed $C^\mu$. $C^\mu$ may be defined as the maximum number of CCEs per slot in a cell configured with a subcarrier spacing of $15 \cdot 2^\mu$ kHz, as shown in [Table 11].

TABLE 11

| μ | Maximum number of CCEs per slot and per serving cell ($C^\mu$) |
| --- | --- |
| 0 | 56 |
| 1 | 56 |
| 2 | 48 |
| 3 | 32 |

For convenience of a description, a situation satisfying both Condition 1 and Condition 2 at a certain point in time may be defined as "Condition A", for example. Thus, failing to satisfy Condition A may mean that at least one of Condition 1 or Condition 2 is not satisfied.

Depending on configuration of search space sets by the base station, Condition A may not be satisfied at a certain point in time. When Condition A is not satisfied at a certain point in time, the terminal may select and monitor some of search space sets configured to satisfy Condition A at the point in time, and the base station may transmit the PDCCH through the selected search space set.

According to an embodiment of the disclosure, the following method may be used to select some search space of the configured search space set.

[Method 1]

When Condition A for the PDCCH is not satisfied at a certain point in time (slot), the terminal (or the base station) may preferentially select a search space set of a search space type configured as a common search space over a search space set of a search space type configured as a terminal-specific search space among search space sets existing at a certain point in time.

When all the search space sets set as the common search spaces are selected (i.e., Condition A is satisfied even after selection of all the search space sets configured as the common search spaces), the terminal (or the base station) may select a search space set that is configured for the terminal-specific search space. When a plurality of search space sets are configured as terminal-specific search spaces, the terminal or the base station may select the terminal-specific search space sets in a range where Condition A is satisfied, based on priority. For example, a search space set having a lower search space set index may have a higher priority.

In the following description, time and frequency resource allocation methods for data transmission in NR system will be described.

In NR system, in addition to frequency-domain resource candidate allocation through a BWP indication, the following detailed frequency-domain resource allocation (FD-RA) methods may be provided.

Figure 6:
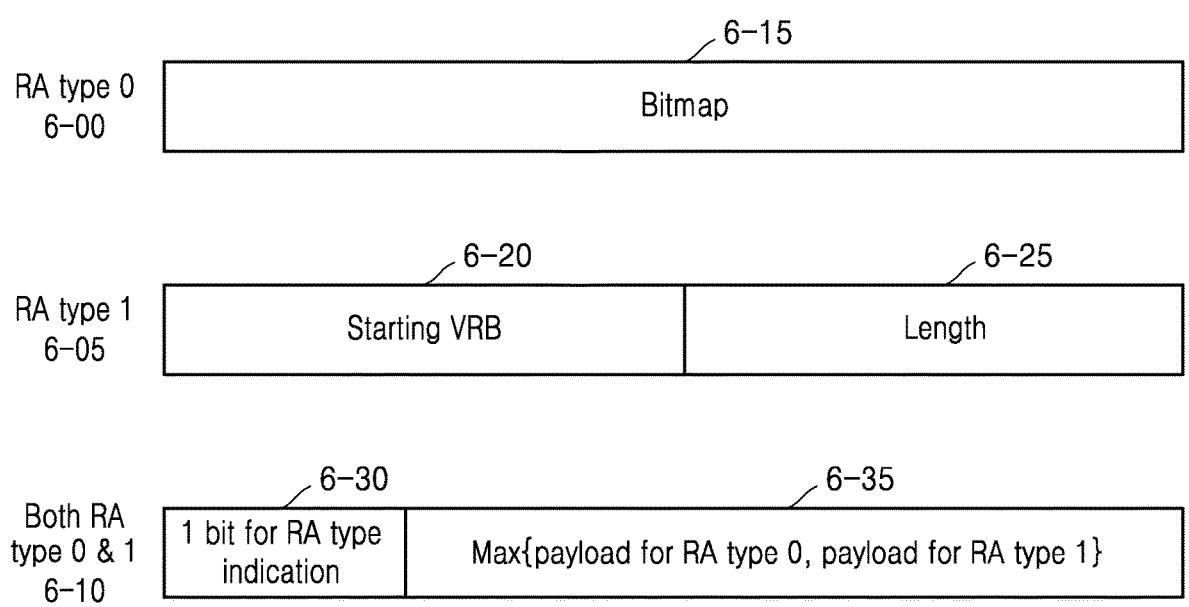
FIG. 6 illustrates an example of frequency-domain resource allocation of a physical downlink shared channel (PDSCH) in a wireless communication system, according to an embodiment of the disclosure.

FIG. 6 illustrates an example of frequency-domain resource allocation of a physical downlink shared channel (PDSCH) in a wireless communication system, according to an embodiment of the disclosure.

In FIG. 6, three FD-RA methods of type 0 6-00, type 1 6-05, and dynamic switch 6-10 that may be configured through a higher layer in NR are shown.

Referring to FIG. 6, when the terminal is configured to use resource type 0 6-00 through higher-layer signaling, the DCI for allocating the PDSCH to the terminal may include a bitmap including NRBG bits. The conditions for the descriptions above will be described again below. The NRBG may mean the number of resource block groups (RBGs) determined as shown in [Table 12] based on a BWP size allocated by a BWP indicator and a higher-layer parameter rbg-Size, and data may be transmitted in an RBG indicated as "1" by the bitmap.

TABLE 12

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the terminal is configured to use resource type 1 6-05 through higher-layer signaling, some DCI for allocating a PDSCH to the terminal may have frequency-domain resource allocation information including $\lceil \log_2(N_{RB}^{DL,BWP}(N_{RB}^{DL,BWP}1)/2) \rceil$ bits. The conditions for the descriptions above will be described again below. In this way, the base station may configure a starting VRB 6-20 and a length 6-25 of frequency-domain resources consecutively allocated therefrom.

When the terminal is configured to use both resource 0 and resource type 1 6-10 through higher-layer signaling, some DCI for allocating the PDSCH to the terminal may include frequency-domain resource allocation information including bits of the largest value 6-35 among a payload 6-15 for setting resource type 0 and payloads 6-20 and 6-25 for setting resource type 1. The conditions for the descriptions above will be described again below. In this case, one bit may be added to the foremost (a most significant bit (MSB)) of frequency-domain resource allocation information in DCI, and when the bit of 0 is used, the resource type 0 may be indicated to be used, and when the bit of 1 is used, the resource type 1 may be indicated to be used.

Figure 7:
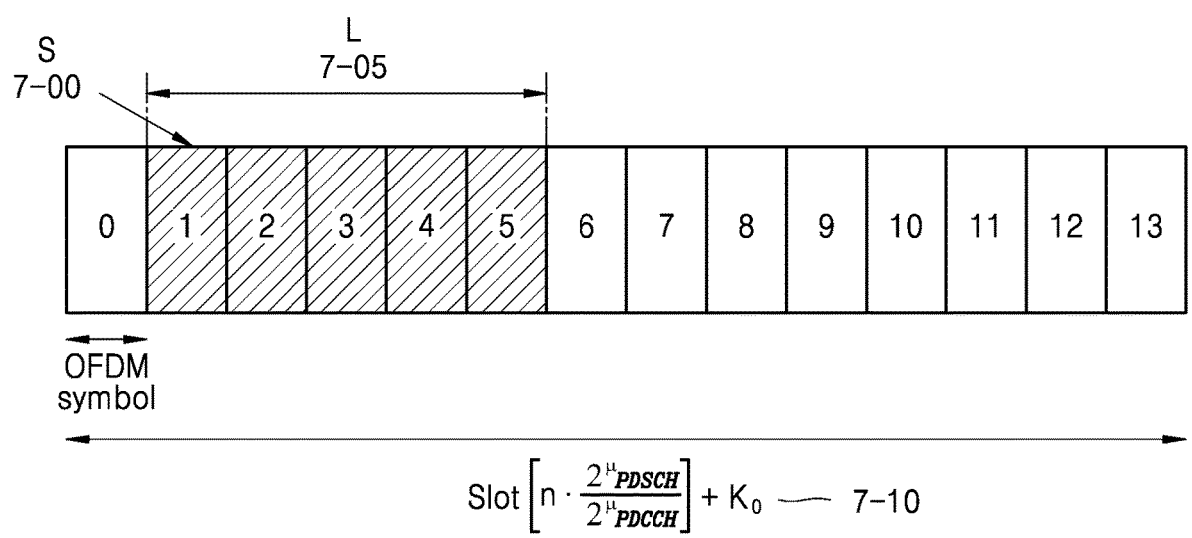
FIG. 7 illustrates an example of time-domain resource allocation of a PDSCH in a wireless communication system, according to an embodiment of the disclosure.

FIG. 7 illustrates an example of time-domain resource allocation of a physical downlink shared channel (PDSCH) in a wireless communication system, according to an embodiment of the disclosure.

The following description will be made of a method of time-domain resource allocation with respect to a data channel in a wireless communication system (e.g., a 5G or NR system).

The base station may configure the terminal with a table regarding time-domain resource allocation information for a PDSCH and a PUSCH through higher layer signaling (e.g., RRC signaling). A table including the maximum of maxNrofDL-Allocations=16 entries may be configured for the PDSCH, and a table including the maximum of maxNrofUL-Allocations=16 entries may be configured for the PUSCH. In an embodiment of the disclosure, time-domain resource allocation information may include a PDCCH-to-PDSCH slot timing (a time interval in the unit of a slot between a timing to receive the PDCCH and a timing to transmit the PDSCH scheduled by the received PDCCH, indicated by K0), a PDCCH-to-PUSCH slot timing (a time interval in the unit of a slot between a timing to receive the PDCCH and a timing to transmit the PUSCH scheduled by the received PDCCH, indicated by K2), information about a position and a length of a start symbol scheduled by the PDSCH or the PUSCH in a slot, a mapping type of the PDSCH or the PUSCH, etc. For example, information like [Table 13] or [Table 14] may be notified from the base station to the terminal.

TABLE 13

PDSCH-TimeDomainResourceAllocationList information element

-- ASN1START
-- TAG-PDSCH-TIMEDOMAINRESOURCEALLOCATIONLIST-START
PDSCH-TimeDomainResourceAllocationList ::=   SEQUENCE (SIZE(1..maxNrofDL-
Allocations)) OF PDSCH-TimeDomainResourceAllocation
PDSCH-TimeDomainResourceAllocation ::=   SEQUENCE {
    k0                              INTEGER(0..32)
OPTIONAL,     --Need S
    mappingType                     ENMUERATED {typeA, typeB},
    startSymbolAndLength            INTEGER (0..127)
}

TABLE 14

PUSCH-TimeDomainResourceAllocation information element

PUSCH-TimeDomainResourceAllocationList ::=   SEQUENCE (SIZE(1..maxNrofUL-
Allocations)) OF PUSCH-TimeDomainResourceAllocation
PUSCH-TimeDomainResourceAllocation ::=   SEQUENCE {
    k2                              INTEGER(0..32)
OPTIONAL,  --Need S
    mappingType                     ENUMERATED {typeA, typeB},
    startSymbolAndLength            INTEGER (0..127)
}

The base station may notify the terminal of one of the entries of the table regarding the time-domain resource allocation information through L1 signaling (e.g., the DCI) (e.g., the time-domain resource allocation information may be indicated by a 'time-domain resource allocation' in the DCI). The terminal may obtain time-domain resource allocation information for the PDSCH or the PUSCH based on the DCI received from the base station.

For example, FIG. 7 shows an example of time-domain resource allocation of NR system.

Referring to FIG. 7, the base station may indicate a time-domain position of a PDSCH resource according to a start position 7-00 and a length 7-05 of OFDM symbols in one slot dynamically indicated by subcarrier spacings (SCS) ($\mu_{PDSCH}$, $\mu_{PDCCH}$) of a data channel and a control channel configured using a higher layer, a scheduling offset $K_0$, and DCI.

Figure 8:
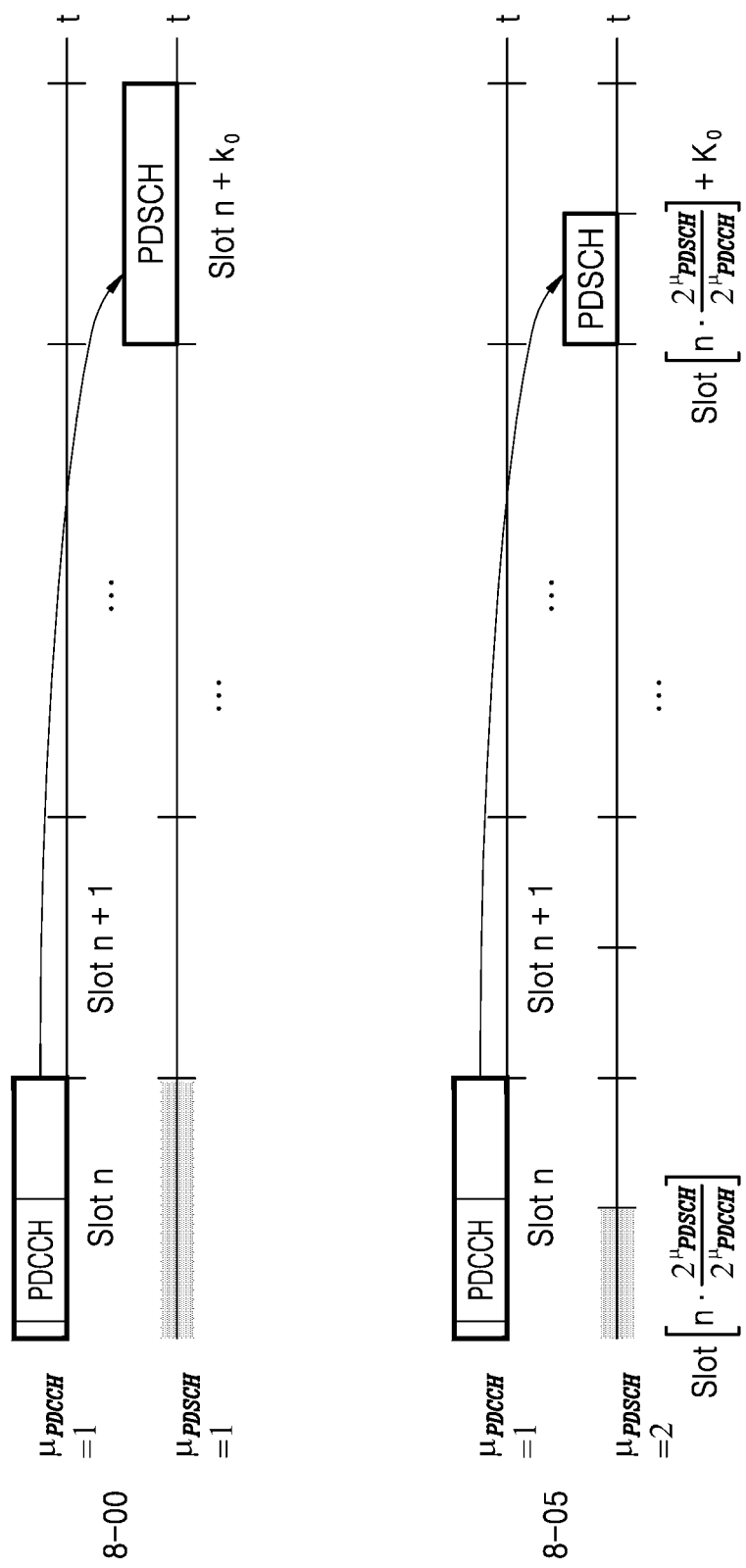
FIG. 8 illustrates an example of time-domain resource allocation with respect to subcarrier spacing of a data channel and a control channel in a wireless communication system, according to an embodiment of the disclosure.

FIG. 8 illustrates an example of time-domain resource allocation with respect to subcarrier spacing of a data channel and a control channel in a wireless communication system, according to an embodiment of the disclosure.

Referring to FIG. 8, when SCS of the data channel and SCS of the control channel are equal to each other as indicated by 8-00 $\mu_{PDSCH}=\mu_{PDCCH}$, slot numbers for data and control are the same as each other, such that the base station and the terminal may recognize occurrence of scheduling offset according to predefined slot offset $K_0$. On the other hand, when SCS of the data channel and SCS of the control channel are different from each other as indicated by 8-05 $\mu_{PDSCH}\neq\mu_{PDCCH}$, slot numbers for data and control are different from each other, such that the base station and the terminal may recognize occurrence of scheduling offset according to predefined slot offset $K_0$, based on an SCS of the PDCCH.

In LTE system and NR system, in a state of being connected to a serving base station, the terminal may report a capability supported by the terminal to the serving base station. In the following description, this will be referred to as UE capability (report). The base station may transmit a UE capability enquiry message requesting a capability report to the terminal in the connected state. The UE capability enquiry message may include a radio access technology (RAT) type-specific UE capability request by the base station. The RAT type-specific request may include a frequency band information to request. Through the UE capability enquiry message, a plurality of RAT types may be requested in one RRC message container, or the UE capability enquiry message including each RAT type-specific request may be included a plurality of times and transmitted to the terminal. That is, the UE capability enquiry may be repeated a plurality of times, and the terminal may configure the corresponding UE capability information message and may report the same a plurality of times. In the wireless communication system, terminal capability requesting for MR-DC as well as NR, LTE, and EN-DC may be performed. For reference, the UE capability enquiry message may be generally transmitted at an initial stage after the terminal performs connection, but may also be transmitted on any condition when needed by the base station.

In this stage, the terminal having received the UE capability report request from the base station may configure a terminal capability based on RAT type and band information requested from the base station. In the NR system, the terminal may configure the UE capability as below.

1. When the terminal is provided with a list of LTE and/or NR bands from the base station in response to the UE capability request, the terminal may configure a band combination (BC) for EN-DC and NR stand-alone (SA). That is, the terminal may configure a candidate BC list for EN-DC and NR SA, based on the bands requested to the base station through FreqBandList. The band may also have a priority as written in FreqBandList.

2. When the base station sets an "eutra-nr-only" flag or an "eutra" flag and requests UE capability report, the terminal may completely remove those related to NR SA BCs from the configured candidate BC list. This operation may be performed when an LTE base station (eNB) requests an "eutra" capability.

3. Thereafter, the terminal may remove fallback BCs from the configured candidate BC list. Herein, the fallback BC may correspond to a case where a band corresponding to at least one SCell is removed from a certain super set BC, and the super set BC is already capable of covering the fallback BC and thus the fallback BC can be omitted. This operation may also be applied in the MR-DC, i.e., LTE bands. The BC remaining after this operation may be a final "candidate BC list".

4. The terminal may select BCs to be reported by selecting BCs suitable for the requested RAT type from the final "candidate BC list". In this step, the terminal may configure supportedBandCombinationList in a determined order. That is, the terminal may configure a BC to be reported and a UE capability according to a preset RAT-type order. (nr→eutra-nr→eutra). The terminal may configure featureSetCombination for configured supportedBandCombinationList and may configure a list of "candidate feature set combinations" in the candidate BC list from which a list of fallback BCs (having capabilities of the same or lower level) is removed. The "candidate feature set combination" may include all feature set combinations for NR and EUTRA-NR BCs and may be obtained from a feature set combination of UE-NR-Capabilities and a UE-MRDC-Capabilities container.

5. When the requested RAT type is an EUTRA-NR and has an influence, featureSetCombinations may be included in two containers of UE-MRDC-Capabilities and UE-NR-Capabilities. However, a feature set of New Radio (NR) may include UE-NR-Capabilities alone.

After the UE capability is configured, the terminal may transmit a UE capability information message including the UE capability to the base station. The base station may perform scheduling and transmission and reception management that are appropriate for the terminal, based on the UE capability received from the terminal.

NR system may have a CSI framework for indicating, in the base station, CSI measurement and report of the terminal. The CSI framework of NR system may include at least two elements of resource setting and report setting, in which report setting may have a relationship by referring to at least one of IDs of resource setting.

According to an embodiment of the disclosure, resource setting may include information related to a reference signal (RS) for CSI measurement of the terminal. The base station may configure at least one resource setting for the terminal. For example, the base station and the terminal may transmit and receive signaling information as shown in [Table 15] to transmit information about resource setting.

TABLE 15

```
-- ASN1START
-- TAG-CSI-RESOURCECONFIG-START
CSI-ResourceConfig ::=        SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList   SEQUENCE (SIZE (1..maxNrofNZP-CSI-RS-ResourceSetsPerConfig) OF NZP-CSI-RS-ResourceSetId
OPTIONAL, -- Need R
            csi-SSB-ResourceSetList      SEQUENCE (SIZE (1..maxNrofCSI-SSB-ResourceSetsPerConfig)) OF CSI-SSB-ResourceSetId
OPTIONAL    -- Need R
        }
        csi-IM-ResourceSetList       SEQUENCE (SIZE (1..maxNrofCSI-IM-ResourceSetsPerConfig)) OF CSI-IM-ResourceSetId
    },
    bwp-Id                      BWP-Id,
    resourceType                ENUMERATED { aperiodic, semiPersistent, periodic },
    ...
}
-- TAG-CSI-RESOURCECONFIG-STOP
-- ASN1STOP
```

In [Table 15], signaling information "CSI-ResourceConfig" may include information about each resource setting. According to signaling information, each resource setting may include a resource setting index csi-ResourceConfigId, a BWP index bwp-ID, resource time-domain transmission setting (resourceType), or a resource set list csi-RS-ResourceSetList including at least one resource set. Time-domain transmission of resources may be set to aperiodic transmission, semi-persistent transmission, or periodic transmission. A resource set list may be a group of resource sets for channel measurement or a group of resource sets for interference measurement. When the resource set list is the group including resource sets for channel measurement, each resource set may include at least one resource, which may be an index of a CSI-RS resource or an SS/PBCH block (SSB). When the resource set list is the group including the resource sets for interference measurement, each resource set may include at least one CSI-interference measurement (CSI-IM) resource.

For example, when the resource set includes a CSI-RS, the base station and the terminal may exchange signaling information as shown in [Table 16] to transmit information about a resource set.

TABLE 16

```
-- ASN1START
-- TAG-NZP-CSI-RS-RESOURCESET-START
NZP-CSI-RS-ResourceSet ::=      SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-ResourcesPerSet)) OF NZP-CSI-RS-ResourceId,
    repetition                  ENUMERATED { on, off }
OPTIONAL,  --Need S
    aperiodicTriggeringOffset   INTEGER(0..6)
OPTIONAL,  --Need S
    trs-Info                    ENUMERATED {true}
OPTIONAL,  --Need R
    ...
}
-- TAG-NZP-CSI-RS-RESOURCESET-STOP
-- ASN1STOP
```

In [Table 16], signaling information NZP-CSI-RS-ResourceSet may include information about each resource set. According to the signaling information, each resource set may include information about a resource set index nzp-CSI-ResourceSetId or an index group nzp-CSI-RS-Resources of an included CSI-RS, and include a part of information (repetition) about a spatial domain transmission filter of an included CSI-RS resource or a part of information of tracking usage trs-Info of the included CSI-RS resource.

The CSI-RS may be the most representative RS included in the resource set. The base station and the terminal may exchange signaling information as shown in [Table 17] to transmit information about the CSI-RS resource.

TABLE 17

```
-- ASN1START
-- TAG-NZP-CSI-RS-RESOURCE-START
NZP-CSI-RS-Resource ::=           SEQUENCE {
    nzp-CSI-RS-ResourceId             NZP-CSI-RS-ResourceId,
    resourceMapping                   CSI-RS-ResourceMapping,
    powerControlOffset                INTEGER (-8..15),
    powerControlOffsetSS              ENUMERATED{db-3, db0, db3, db6}
OPTIONAL,    --Need R
    scramblingID                      ScramblingId,
    periodicityAndOffset              CSI-ResourcePeriodicityAndOffset
OPTIONAL,    --Cond PeriodicOrSemiPersistent
    qcl-InfoPeriodicCSI-RS            TCI-StateId
OPTIONAL,    --Cond Periodic
    ...
}
-- TAG-NZP-CSI-RESOURCE-STOP
-- ASN1STOP
```

In [Table 17], signaling information NZP-CSI-RS-Resource may include information about each CSI-RS. Information included in the signaling information NZP-CSI-RS-Resource may have the following meaning:

nzp-CSI-RS-ResourceId: a CSI-RS resource index resourceMapping: resource mapping information of a CSI-RS resource powerControlOffset: a rate between PDSCH EPRE (Energy Per Re) and CSI-RS EPRE powerControlOffsetSS: a rate between SS/PBCH block EPRE and CSI-RS EPRE scramblingID: a scrambling index of a CSI-RS sequence periodicityAndOffset: a transmission period of a CSI-RS resource and a slot offset qcl-InfoPeriodicCSI-RS: TCI-state information for a periodic CSI-RS when the CSI-RS is a periodic CSI-RS resourceMapping included in the signaling information NZP-CSI-RS-Resource may indicate resource mapping information of a CSI-RS resource, including frequency resource element (RE) mapping, a port number, symbol mapping, CDM type, a frequency resource density, and frequency band mapping information. The port number, the frequency resource density, the CDM type, and the time-frequency domain RE mapping configured in this way may have a value set to one of rows of [Table 18].

TABLE 18

| Row | Ports X | Density ρ | cdm-type | $(\bar{k}, \bar{l})$ | CDM group index j | k' | l' |
| --- | --- | --- | --- | --- | --- | --- | --- |
| 1 | 1 | 3 | No CDM | $(k_0, l_0), (k_0 + 4, l_0), (k0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1),$ $(k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0),$ $(k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1),$ $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1 ,2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_1, l_0 + 1), (k_2, l_0 + 1), (k_0, l_1), (k_1, l_1),$ $(k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0, 1 |
| 14 | 24 | 1, 0.5 | CDM4 (FD2, TD2) | $(k_0, l_0), (k_1, l_0), (k_2, l_0), (k_0, l_1),$ $(k_1, l_1), (k_2, l_1)$ | 0, 1, 2, 3, 4, 5 | 0, 1 | 0, 1 |

TABLE 18-continued

| Row | Ports X | Density ρ | cdm-type | ($\bar{k}$, $\bar{l}$) | CDM group index j | k' | l' |
|---|---|---|---|---|---|---|---|
| 15 | 24 | 1, 0.5 | CDM8 (FD2, TD4) | ($k_0$, $l_0$), ($k_1$, $l_0$), ($k_2$, $l_0$) | 0, 1, 2 | 0, 1 | 0, 1, 2, 3 |
| 16 | 32 | 1, 0.5 | FD-CDM2 | ($k_0$, $l_0$), ($k_1$, $l_0$), ($k_2$, $l_0$), ($k_3$, $l_0$), ($k_0$, $l_0$ + 1), ($k_1$, $l_0$ + 1), ($k_2$, $l_0$ + 1), ($k_3$, $l_0$ + 1), ($k_0$, $l_1$), ($k_1$, $l_1$), ($k_2$, $l_1$), ($k_3$, $l_1$), ($k_0$, $l_1$ + 1), ($k_1$, $l_1$ + 1), ($k_2$, $l_1$ + 1), ($k_3$, $l_1$ + 1) | 0, 1, 2, 3, 4, 5, 6, 7, 8, 9, 10, 11, 12, 13, 14, 15 | 0, 1 | 0, 1 |
| 17 | 32 | 1, 0.5 | CDM4 (FD2, TD2) | ($k_0$, $l_0$), ($k_1$, $l_0$), ($k_2$, $l_0$), ($k_3$, $l_0$), ($k_0$, $l_1$), ($k_1$, $l_1$), ($k_2$, $l_1$), ($k_3$, $l_1$) | 0, 1, 2, 3, 4, 5, 6, 7 | 0, 1 | 0, 1 |
| 18 | 32 | 1, 0.5 | CDM8 (FD2, TD4) | ($k_0$, $l_0$), ($k_1$, $l_0$), ($k_2$, $l_0$), ($k_3$, $l_0$) | 0, 1, 2, 3 | 0, 1 | 0, 1, 2, 3 |

[Table 18] may indicate a frequency resource density, a CDM type, frequency-domain and time-domain start positions ($\bar{k}$,$\bar{l}$) of a CSI-RS component RE pattern, a frequency-domain RE number (k') and a time-domain RE number (l') of the CSI-RS component RE pattern that are settable according to a CSI-RS port number X. The foregoing CSI-RS component RE pattern may be the basic unit forming a CSI-RS resource. Through Y=1+max(k') REs of the frequency domain and Z=1+max(l') REs of the time domain, a CSI-RS component RE pattern may include YZ REs. When the CSI-RS port number is "1" port, a CSI-RS RE position may be designated without a restriction on a subcarrier in a PRB (Physical Resource Block) and may be designated by a bitmap of 12 bits. For the CSI-RS port number of {2, 4, 8, 12, 16, 24, 32} and Y=2, a CSI-RS RE position may be designated for every two subcarriers in a PRB and may be designated by a bitmap of 6 bits. For a CSI-RS port number of 4 and Y=4, a CSI-RS RE position may be designated for every four subcarriers in a PRB and may be designated by a bitmap of 6 bits. Likewise, a time-domain RE position may be designated by a bitmap of a total of 14 bits. In this case, a length of a bitmap may change according to Z of [Table 18] as frequency position designation, but a principle thereof is similar to the foregoing description and thus a redundant description will be omitted.

According to an embodiment of the disclosure, report setting has connections with resource setting based on at least one ID of the resource setting and resource setting(s) having connections with report setting may provide configuration information including information about an RS for channel information measurement. When resource setting(s) having connections with report setting is used for channel information measurement, the measured channel information may be used for channel information reporting based on a reporting method configured in report setting having the connections.

According to an embodiment of the disclosure, report setting may include configuration information related to a CSI reporting method. For example, the base station and the terminal may exchange signaling information as shown in [Table 19] to transmit information about report setting.

TABLE 19

```
-- ASN1START
-- TAG-CSI-REPORTCONFIG-START
CSI-ReportConfig ::=                SEQUENCE {
    reportConfigId                      CSI-ReportConfigId,
    carrier                             ServCellIndex
OPTIONAL,   -- Need S
    resourcesForChannelMeasurement      CSI-ResourceConfigId,
    csi-IM-ResourcesForInterference     CSI-ResourceConfigId
OPTIONAL,   -- Need R
    nzp-CSI-RS-ResourcesForInterference CSI-ResourceConfigId
OPTIONAL,   -- Need R
    reportConfigType                    CHOICE {
        periodic                            SEQUENCE {
            reportSlotConfig                    CSI-ReportPeriodicityAndOffset,
            pucch-CSI-Resource-List             SEQUENCE (SIZE
(1..maxNrofBWPs)) OF PUCCH-CSI-Resource
        },
        semiPersistentOnPUCCH               SEQUENCE {
            reportSlotConfig                    CSI-ReportPeriodicityAndOffset,
            pucch-CSI-Resource-List             SEQUENCE (SIZE
(1..maxNrofBWPs)) OF PUCCH-CSI-Resource
        },
        semiPersistentOnPUSCH               SEQUENCE {
            reportSlotConfig                    ENUMERATED {sl5, sl10, sl20,
sl40, sl80, sl160, sl320},
            reportSlotOffsetList                SEQUENCE (SIZE (1..maxNrofUL-
Allocations)) OF INTEGER(0..32),
            p0alpha                             P0-PUSCH-AlphaSetId
        },
        aperiodic                           SEQUENCE {
            reportSlotOffsetList                SEQUENCE (SIZE (1..maxNrofUL-
Allocations)) OF INTEGER(0..32)
        }
    },
    reportQuantity                      CHOICE {
        none                                NULL,
        cri-RI-PMI-CQI                      NULL,
```

TABLE 19-continued

```
            eri-RI-i 1                          NULL,
            eri-RI-i 1-CQI                     SEQUENCE {
                pdsch-BundleSizeForCSI             ENUMERATED {n2, n4}
OPTIONAL   --Need S
            },
            cri-RI-CQI                         NULL,
            cri-RSRP                           NULL,
            ssb-Index-RSRP                     NULL,
            cri-RI-LI-PMI-CQI                  NULL
        },
        reportFreqConfiguration                SEQUENCE
            cqi-FormatIndicator                ENUMERATED { widebandCQI,
subbandCQI }                                   OPTIONAL,   --Need R
            pmi-FormatIndicator                ENUMERATED { widebandPMI,
subbandPMI }                                   OPTIONAL,   --Need R
            csi-ReportingBand                  CHOICE {
                subbands3                          BIT STRING(SIZE(3)),
                subbands4                          BIT STRING(SIZE(4)),
                subbands5                          BIT STRING(SIZE(5)),
                subbands6                          BIT STRING(SIZE(6)),
                subbands7                          BIT STRING(SIZE(7)),
                subbands8                          BIT STRING(SIZE(8)),
                subbands9                          BIT STRING(SIZE(9)),
                subbands10                         BIT STRING(SIZE(10)),
                subbands11                         BIT STRING(SIZE(11)),
                subbands12                         BIT STRING(SIZE(12)),
                subbands13                         BIT STRING(SIZE(13)),
                subbands14                         BIT STRING(SIZE(14)),
                subbands15                         BIT STRING(SIZE(15)),
                subbands16                         BIT STRING(SIZE(16)),
                subbands17                         BIT STRING(SIZE(17)),
                subbands18                         BIT STRING(SIZE(18)),
                ...,
                subbands19-v1530                   BIT STRING(SIZE(19))
            }   OPTIONAL   --Need S
        }
OPTIONAL,   --Need R
        timeRestrictionForChannelMeasurements      ENUMRATED {configured,
notConfigured},
        timeRestrictionForInterferenceMeasurements ENUMERATED {configured,
notConfigured },
        codebookConfig                             CodebookConfig
OPTIONAL, -- Need R
        dummy                                      ENUMERATED {n1, n2}
OPTIONAL, --Need R
        groupBasedBeamReporting                    CHOICE {
            enabled                                NULL,
            disabled                               SEQUENCE {
                nrofReportedRS                         ENUMERATED {n1, n2, n3,
n4}                        OPTIONAL   --Need S
            }
        },
        cqi-Table                              ENUMERATED {table1, table2, table3, spare1}
OPTIONAL,  --Need R
        subbandSize                            ENUMERATED {value1, value2},
        non-PMI-PortIndication                 SEQUENCE (SIZE (1..maxNroNZP-CSI-RS-
ResourcesPerConfig)) OF PortIndexFor8Ranks OPTIONAL,   -- Need R
        ...,
        [[
        semiPersistentOnPUSCH-v1530            SEQUENCE {
            reportSlotConfig-v1530                 ENUMERATED {sl4, sl8, sl16}
        }
OPTIONAL   --Need R
        ]]
}
```

In [Table 19], signaling information CSI-ReportConfig may include information about each report setting. Information included in the signaling information CSI-ReportConfig may have the following meaning:

reportConfigId: report configuration index carrier: serving cell index resourcesForChannelMeasurement: a resource setting index for channel measurement having connections with report setting csi-IM-ResourcesForInterference: a resource setting index for CSI-IM for interference measurement having connections with report setting nzp-CSI-RS-ResourcesForInterference: a resource setting index for CSI-RS index for interference measurement having connections with report setting reportConfigType: time-domain transmission setting and a transmission channel of a channel report, which may have configuration of aperiodic transmission, semi-persistent PUCCH transmission, semi-periodic PUSCH transmission, or periodic transmission reportQuantity: a type of channel information to be reported, which may have a type of channel information 'cri-RI-PMI-CQI', 'cri-RI-i1', 'cri-RI-i1-CQI', 'cri-RI-CQI', 'cri-RI-RSRP', 'ssb-Index-RSRP', 'cri-RI-LI-PMI-CQI', for a case where a channel report is not transmitted ('none') and a case where a channel report is transmitted Herein, an element included in the type of the channel information may mean a channel quality indicator (CQI), a precoding matrix indicator (PMI), a CSI-RS resource indicator (CRI), an SS/PBCH block resource indicator (SSBRI), a layer indicator (LI), a rank indicator (RI), and/or an L1-reference signal received power (RSRP).

reportFreqConfiguration: whether channel information to be reported includes information about the entire wideband or information about each subband, in which when the channel information includes the information about each subband, configuration information about a subband including the channel information timeRestrictionForChannelMeasurements: whether to restrict the time-domain regarding a reference signal for channel measurement from reference signals to which the channel information to be reported refers timeRestrictionForInterferenceMeasurements: whether to restrict the time-domain regarding a reference signal for interference measurement from reference signals to which the channel information to be reported refers codebookConfig: codebook information to which channel information to be reported groupBasedBeamReporting: whether to perform beam grouping of a channel report cqi-Table: CQI table index to which channel information to be reported refers subbandSize: index indicating a subband size of channel information non-PMI-PortIndication: port mapping information which is to be referred to when non-PMI channel information is reported When the base station indicates a channel information report through higher-layer signaling or L1 signaling, the terminal may perform channel information reporting by referring to the configuration information included in indicated report setting.

The base station may indicate a CSI report to the terminal through higher-layer signaling including RRC signaling or MAC CE signaling or L1 signaling (e.g., common DCI, group-common DCI, terminal-specific DCI).

For example, the base station may indicate an aperiodic CSI report to the terminal through higher-layer signaling or DCI using DCI format 0_1. The base station may configure a parameter for an aperiodic CSI report of the terminal or multiple CSI report trigger states including a parameter for a CSI report through higher-layer signaling. The parameter for the CSI report or the CSI report trigger state may include a group including a slot interval between a PDCCH including DCI and a PUCCH or PUSCH including a CSI report or a possible slot interval, an RS ID for channel state measurement, a type of included channel information, etc. When the base station indicates some of the multiple CSI report trigger states to the terminal through the DCI, the terminal may report channel information according to CSI report configuration of report setting configured in the indicated CSI report trigger state. Time-domain resource allocation of a PUCCH or a PUSCH including a CSI report of the terminal may be indicated through a slot interval with a PDCCH indicated through the DCI, indication of a start symbol and a symbol length in a slot for time-domain resource allocation of a PUSCH, and the entire PUCCH resource indication or a part thereof. For example, the position of the slot in which the PUSCH including the CSI report of the terminal is transmitted may be indicated through the slot interval with the PDCCH indicated through the DCI, and the start symbol and the symbol length in the slot may be indicated through a time-domain resource assignment field of the DCI.

For example, the base station may indicate a semi-persistent CSI report to the terminal through higher-layer signaling or DCI using DCI format 0_1. The base station may activate or deactivate a semi-persistent CSI report through higher layer signaling including MAC CE signaling or DCI scrambled by SP-CSI-RNTI. Upon activation of the semi-persistent CSI report, the terminal may periodically report channel information according to the configured slot interval. Upon deactivation of the semi-persistent CSI report, the terminal may stop the activated periodic channel information report. The base station may configure a parameter for a semi-persistent CSI report of the terminal or multiple CSI report trigger states including the parameter for the semi-persistent CSI report through higher-layer signaling.

The parameter for the CSI report or the CSI report trigger state may include a group including a slot interval between a PDCCH including DCI indicating a CSI report and a PUCCH or PUSCH including the CSI report or a possible slot interval, a slot interval between a slot activated by higher layer signaling indicating the CSI report and a PUCCH or PUSCH including a CSI report, a slot interval period of the CSI report, a type of channel information to include, etc. When the base station activates some of the multiple CSI report trigger states or some of the multiple report settings to the terminal through the higher-layer signaling or the DCI, the terminal may report channel information according to report setting included in the indicated CSI report trigger state or CSI report configuration configured in the activated report setting. Time-domain resource assignment of a PUCCH or a PUSCH including a CSI report of the terminal may be indicated through a slot interval period of a CSI report, a slot interval with a slot in which higher-layer signaling is activated, a slot interval with a PDCCH indicated through DCI, indication of a start symbol and a symbol length in a slot for time-domain resource assignment of a PUSCH, and some or all of PUCCH resource indication thereof. For example, the position of the slot in which the PUSCH including the CSI report of the terminal is transmitted may be indicated through the slot interval with the PDCCH indicated through the DCI, and the start symbol and the symbol length in the slot may be indicated through a time-domain resource assignment field of the DCI format 0_1. For example, a position of a slot in which the PUCCH including the CSI report of the terminal is transmitted may be indicated by a slot interval period of the CSI report configured through higher layer signaling and a slot interval between a slot in which higher layer signaling is activated and a slot of the PUCCH including the CSI report, and a start symbol in the slot and a symbol length may be indicated through a start symbol and a symbol length allocated with a PUCCH resource configured through higher layer signaling.

For example, the base station may indicate a periodic CSI report to the terminal through higher layer signaling. The base station may activate or deactivate the periodic CSI report through higher layer signaling including RRC signaling. Upon activation of the periodic CSI report, the terminal may periodically report channel information according to the configured slot interval. Upon deactivation of the periodic CSI report, the terminal may stop the activated periodic channel information report. The base station may configure report setting including a parameter for the periodic CSI report of the terminal through higher layer signaling. The parameter for the CSI report may include a slot interval between a slot in which higher layer signaling indicating the CSI report is activated and the PUCCH or PUSCH including the CSI report, the slot interval period of the CSI report, an RS ID for channel state measurement, a type of included channel information, etc. Time-domain resource assignment of the PUCCH or the PUSCH including the CSI report of the terminal may be indicated through the slot interval period of the CSI report, the slot interval with the slot in which higher-layer signaling is activated, a slot interval with a PDCCH indicated through DCI, indication of the start symbol and the symbol length in the slot for time-domain resource assignment of the PUSCH, and some or all of the PUCCH resource indication. For example, the position of the slot in which the PUCCH including the CSI report of the terminal is transmitted may be indicated by a slot interval period of the CSI report configured through higher layer signaling and a slot interval between a slot in which higher layer signaling is activated and the PUCCH including the CSI report, and a start symbol in the slot and a symbol length may be indicated through a start symbol allocated with a PUCCH resource configured through higher layer signaling and a symbol length.

When the base station indicates an aperiodic CSI report or a semi-persistent CSI report to the terminal through the DCI, the terminal may determine whether valid channel reporting may be performed through the indicated CSI report, taking a CSI computation time necessary for the CSI report into account. The terminal may perform valid CSI reporting from an uplink symbol after the Z symbol from the end of the last symbol included in the PDCCH including the DCI indicating the CSI report for the aperiodic CSI report or the semi-persistent CSI report indicated by the DCI. The foregoing Z symbol may vary with numerology of a downlink bandwidth part corresponding to the PDCCH including the DCI indicating the CSI report, numerology of an uplink bandwidth part corresponding to the PUSCH transmitting the CSI report, or a type or characteristics (report quantity, frequency band granularity, a port number of an RS, a codebook type, etc.) of channel information reported in the CSI report. In other words, for determining a certain CSI report as a valid CSI report (for determining of a corresponding CSI report as a valid CSI report), uplink transmission of the CSI report should not be performed prior to a Zref symbol including a timing advance. In this case, the Zref symbol is an uplink symbol in which a cyclic prefix (CP) starts after a time $T_{proc,CSI}=(Z)(2048+144)\cdot\kappa 2^{-\mu}\cdot T_C$ from the end of the last symbol of the triggering PDCCH. Herein, a detailed value of Z may follow the description provided below, and $T_c=1/(\Delta f_{max}\cdot N_f)$, $\Delta f_{max}=480\cdot 10^3$ Hz, $N_f=4096$, $\kappa=64$, and $\mu$ may be numerology. In this case, $\mu$ may be agreed to use one of ($\mu_{PDCCH}$, $\mu_{CSI-RS}$, $\mu_{UL}$), which causes the greatest $T_{proc,CSI}$, and $\mu_{PDCCH}$ may mean a subcarrier spacing used for PDCCH transmission, $\mu_{CSI-RS}$ may mean a subcarrier spacing used for CSI-RS transmission, and $\mu_{UL}$ may mean a subcarrier spacing of an uplink channel used for uplink control information (UCI) transmission for CSI reporting. In another example, $\mu$ may be agreed to use one of ($\mu_{PDCCH}$, $\mu_{UL}$), which causes the greatest $T_{proc,CSI}$. Definitions of $\mu_{PDCCH}$ and $\mu_{UL}$ will refer to the above description. For convenience of the following description, satisfying the foregoing condition may be referred to as satisfying CSI reporting validity condition 1.

In addition, when the RS for channel measurement with respect to the aperiodic CSI report indicated to the terminal through the DCI is the aperiodic RS, the terminal may execute valid CSI reporting from an uplink symbol after a Z' symbol from the end of the last symbol including the RS, in which the foregoing Z' symbol may vary with numerology of a downlink bandwidth part to which the PDCCH including the DCI indicating the CSI report corresponds, numerology of a bandwidth to which an RS for channel measurement corresponds for the CSI report, numerology of an uplink bandwidth part corresponding to the PUSCH transmitting the CSI report, or a type or characteristics (report quantity, frequency band granularity, a port number of an RS, a codebook type, etc.) of channel information reported in the CSI report. In other words, for identification of a certain CSI report as a valid CSI report (for identification of a corresponding CSI report as a valid CSI report), uplink transmission of the CSI report should not be performed prior to a Zref symbol by including a timing advance. In this case, a Zref symbol is an uplink symbol in which a cyclic prefix (CP) starts after a time $T_{proc,CSI}=(Z')(2048+144)\cdot\kappa 2^{-\mu}\cdot T_C$ from the end of the last symbol of the aperiodic CSI-RS or the aperiodic CSI-IM triggered by the triggering PDCCH. Herein, a detailed value of Z' may follow the description provided below, and $T_c=1/(\Delta f_{max}\cdot N_f)$, $\Delta f_{max}=480\cdot 10^3$ Hz, $N_f=4096$, $\kappa=64$, and $\mu$ may be numerology. In this case, $\mu$ may be agreed to use one of ($\mu_{PDCCH}$, $\mu_{CSI-RS}$, $\mu_{UL}$), which causes the greatest $T_{proc,CSI}$, and $\mu_{PDCCH}$ may mean a subcarrier spacing used for PDCCH transmission, $\mu_{CSI-RS}$ may mean a subcarrier spacing used for CSI-RS transmission, and $\mu_{UK}$ may mean a subcarrier spacing of an uplink channel used for UCI transmission for CSI reporting. In another example, $\mu$ may be agreed to use one of ($\mu_{PDCCH}$, $\mu_{UL}$), which causes the greatest $T_{proc,CSI}$. In this case, definitions of $\mu_{PDCCH}$ and $\mu_{UL}$ will refer to the above description. For convenience of the following description, satisfying the foregoing condition may be referred to as satisfying CSI reporting validity condition 2.

When the base station indicates the aperiodic CSI report for the aperiodic RS to the terminal through the DCI, the terminal may perform valid CSI reporting from the first uplink symbol which satisfies both a point in time after the Z symbol from the end of the last symbol included in the PDCCH including the DCI indicating the CSI report and a point in time after the Z' symbol from the end of the last symbol including the RS. That is, for aperiodic CSI reporting based on the aperiodic RS, the CSI report may be identified as a valid CSI report when both CSI reporting validity conditions 1 and 2 are satisfied.

When a CSI reporting time indicated by the base station fails to satisfy CSI computation time requirements, the terminal may identify the CSI report as being invalid and may not consider updating of a channel information state for the CSI report.

The Z and Z' symbols for calculation of the foregoing CSI computation time may follow [Table 20] and [Table 21]. For example, when channel information reported in the CSI report includes wideband information, a port number of the RS is less than or equal to 4, the number of RS resources is one, and a codebook type is 'typeI-SinglePanel' or a type (report quantity) of channel information to be reported is 'cri-RI-CQI', the Z and Z' symbols may follow the value $Z_1 \cdot Z'_1$ of [Table 21]. This will be referred to as a delay requirement 2. In addition, when the PUSCH including the CSI report does not include a TB or a hybrid automatic request (HARQ)-acknowledgement (ACK) and a CPU occupation of the terminal is 0, the Z and Z' symbols may follow the value $Z_1 \cdot Z'_1$ of [Table 20], which will be referred to as a delay requirement 1. The above-described CPU occupation will be described below in detail. When the report quantity is 'cri-RSRP' or 'ssb-Index-RSRP', the Z and Z' symbols may follow the value $Z_3 \cdot Z'_3$ of [Table 21]. $X_1$, $X_2$, $X_3$, and $X_4$ of [Table 21] may mean a terminal's capability (UE capability) for a beam reporting time, and $KB_1$ and $KB_2$ of [Table 21] may mean a terminal's capability for a beam changing time. When not corresponding to the type or characteristics of the channel information to be reported in the CSI report, the Z and Z' symbols may follow the value $Z_2 \cdot Z'_2$ of [Table 21].

TABLE 20

|   | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 21

|   | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min (44, $X_3$ + $KB_1$) | $X_3$ |
| 3 | 97 | 85 | 152 | 140 | min (97, $X_4$ + $KB_2$) | $X_4$ |

When the base station indicates an aperiodic/semi-persistent/periodic CSI report to the terminal, the base station may configure a CSI reference resource in the unit of a slot to determine a reference time of the RS for channel information measurement reported in the CSI report. For example, when transmission of a CSI report #X in an uplink slot n' is indicated, a CSI reference resource of the CSI report #X to be transmitted in the uplink slot n' may be defined as a downlink slot $n - n_{CSI-ref}$. The downlink slot n may be calculated as $n = \lfloor n' \cdot 2^{\mu_{DL}} / 2^{\mu_{UL}} \rfloor$, considering numerologies $\mu_{DL}$ and $\mu_{UL}$ of the downlink and the uplink. When a CSI report #0 to be transmitted in the uplink slot n' is a semi-persistent or periodic CSI report, a slot interval $n_{CSI-ref}$ between the downlink slot n and the CSI reference resource may follow $n_{CSI-ref} = 4 \cdot 2^{\mu_{DL}}$ when a single CSI-RS resource is connected to the CSI report and follow $n_{CSI-ref} = 5 \cdot 2^{\mu_{DL}}$ when multiple CSI-RS resources are connected to the CSI report, depending on the number of CSI-RS resources for channel measurement. When the CSI report #0 transmitted in the uplink slot n' is the aperiodic CSI report, CSI report #0 may be calculated as $n$ $n_{CSI-ref} = \lfloor Z' / N_{symb}^{slot} \rfloor$ based on a CSI computation time Z' for channel measurement. The foregoing $N_{symb}^{slot}$ may mean the number of symbols included in one slot, and $N_{symb}^{slot} = 14$ is assumed in NR system.

When the base station indicates to the terminal to transmit a certain CSI report in the uplink slot n' through higher layer signaling or DCI, the terminal may report the CSI by performing channel measurement or interference measurement with respect to a CSI-RS resource, a CSI-IM resource, and an SSB resource transmitted not later than a CSI reference resource slot of a CSI report to be transmitted in the uplink slot n' between the CSI-RS resource, the CSI-IM resource, or the SSB resource associated with the CSI report. The CSI-RS resource, the CSI-IM resource, or the SSB resource associated with the CSI report may mean the CSI-RS resource, the CSI-IM resource, or the SSB resource included in the resource set configured in resource setting referred to by the report setting for the CSI report of the terminal, configured through higher layer signaling, the CSI-RS resource, the CSI-IM resource, or the SSB resource referred to by a CSI report trigger state including the parameter for the CSI report, or the CSI-RS resource, the CSI-IM resource, or the SSB resource indicated by the ID of the RS group.

In embodiments of the disclosure, CSI-RS/CSI-IM/SSB occasions may mean transmission points in time of CSI-RS/CSI-IM/SSB resource(s) determined by higher layer configuration or a combination of higher layer configuration and DCI triggering. For example, a slot in which a semi-persistent or periodic CSI-RS resource is to be transmitted may be determined based on a slot period and a slot offset configured through higher layer signaling, and transmission symbol(s) in the slot may be determined by referring to one of resource mapping methods in the slot in [Table 18] according to resource mapping information resourceMapping. In another example, a slot in which an aperiodic CSI-RS resource is to be transmitted may be determined based on a slot offset with a PDCCH including DCI indicating a channel report configured through higher layer signaling, and transmission symbol(s) in the slot may be determined by referring to one of resource mapping methods in the slot in [Table 18] according to resource mapping information resourceMapping.

The above-described CSI-RS occasion may be determined by independently considering a transmission point in time of each CSI-RS resource or by collectively considering transmission points in time of one or more CSI-RS resource(s) included in a resource set, such that the following two analyses may be possible for a CSI-RS occasion corresponding to each resource set configuration.

Analysis 1-1: from the start point of the earliest symbol in which one certain resource among one or more CSI-RS resources included in resource set(s) configured in resource setting referred to by report setting configured for the CSI report is transmitted, to the end point of the last symbol in which the certain resource is transmitted; and Analysis 1-2: from the start point of the earliest symbol in which a CSI-RS transmitted in the earliest point in time among all the CSI-RS resources included in resource set(s) configured in resource setting referred to by report setting configured for the CSI report is transmitted, to the end point of the last symbol in which a CSI-RS transmitted in the last point in time among them is transmitted.

Hereinbelow, in embodiments of the disclosure, by considering both of the two analyses for CSI-RS occasion, separate application may be possible. Moreover, both of the two analyses for CSI-IM occasion and SSB occasion may be considered as in CSI-RS occasion, but a principle thereof is similar to the foregoing description, such that a redundant description will be avoided below.

In embodiments of the disclosure, CSI-RS/CSI-IM/SSB occasions for CSI report #X transmitted in an uplink slot n' may mean a set of a CSI-RS occasion, a CSI-IM occasion, and an SSB occasion which are not later than a CSI reference resource of the CSI report #X transmitted in the uplink slot n' among CSI-RS occasions, CSI-IM occasions, and SSB occasions of CSI-RS resources, CSI-IM resources, and SSB resources included in a resource set configured in resource setting referred to by report setting configured for the CSI report #X.

In embodiments of the disclosure, the last CSI-RS/CSI-IM/SSB occasion among the CSI-RS/CSI-IM/SSB occasions for the CSI report #X transmitted in the uplink slot n' may be analyzed in two manners as below.

Analysis 2-1: a set of occasions including the last CSI-RS occasion among CSI-RS occasions for CSI report #X transmitted in the uplink slot n', the last CSI-IM occasion among the CSI-IM occasions for the CSI report #X transmitted in the uplink slot n', and the last SSB occasion among SSB occasions for CSI report #0 transmitted in the uplink slot n'; and Analysis 2-2: the last occasion among all of CSI-RS occasions, CSI-IM occasions, and SSB occasions for the CSI report #X transmitted in the uplink slot n'.

Hereinbelow, in embodiments of the disclosure, both of the two analyses for the last CSI-RS/CSI-IM/SSB occasion among the CSI-RS/CSI-IM/SSB occasions for the CSI report #X transmitted in the uplink slot n' may be considered for separate application. Given the foregoing two analyses (Analysis 1-1 and Analysis 1-2) for the CSI-RS occasion, the CSI-IM occasion, and the SSB occasion, for "the last CSI-RS/CSI-IM/SSB occasion among the CSI-RS/CSI-IM/SSB occasions for the CSI report #X transmitted in the uplink slot n'", separate application may be possible by considering four different analyses (application of Analysis 1-1 and Analysis 2-1, application of Analysis 1-1 and Analysis 2-2, and application of Analysis 1-2 and Analysis 2-1) in the embodiments of the disclosure.

The base station may indicate a CSI report, taking account of the amount of channel information that may be simultaneously computed by the terminal for the CSI report, i.e., the number of channel information computation units (CSI processing units: CPUs) of the terminal. When the number of CPUs that may be simultaneously computed by the terminal is $N_{CPU}$, the terminal may not expect a CSI report indication of the base station, which needs channel information computation more than $N_{CPU}$, or may not consider update of channel information which needs channel information computation more than $N_{CPU}$. $N_{CPU}$ may be reported by the terminal to the base station through higher layer signaling or may be configured by the base station through higher layer signaling.

The CSI report indicated by the base station to the terminal is assumed to occupy all CPUs or some of them for channel information computation among a total number $N_{CPU}$ of channel information that may be simultaneously computed by the terminal. When the number of CPUs required for each CSI report, e.g., a CSI report n (n=0, 1, . . . , N−1) is $O_{CPU}^{(n)}$, the number of CPUs required for total N CSI reports may be $\Sigma_{n=0}^{N-1} O_{CPU}^{(n)}$.

When the number of channel information computations needed by the terminal for multiple CSI reports at a certain point in time is greater than the number $N_{CPU}$ of CPUs that may be simultaneously computed by the terminal, the terminal may not consider update of channel information for some CSI reports. Among the indicated multiple CSI reports, a CSI report for which update of channel information is not considered may be determined at least based on a time for which channel information computation required for the CSI report occupies CPUs and an importance or a priority of channel information to be reported. For example, the time for which channel information computation required for the CSI report occupies the CPUs may not consider update of channel information for a CSI report starting at the last point in time, and may not preferentially consider update of channel information for a CSI report corresponding to a low priority of channel information.

The CSI priority may be determined referring to [Table 22].

TABLE 22

CSI Priority Values $\text{Pri}_{iCSI}(y, k, c, s) = 2 \cdot N_{cells} \cdot M_s \cdot y + N_{cells} \cdot M_s \cdot k + M_s \cdot c + s$,
y = 0 For Aperiodic CSI Report Transmitted through PUSCH, y=1 For Semi-Persistent CSI Report Transmitted through PUSCH, y=2 For Semi-Persistent CSI Report Transmitted through PUCCH, y=3 For Periodic CSI Report Transmitted through PUCCH;
k = 0 For CSI Report Including L1-RSRP, k=1 For CSI Report without L1-RSRP;
c : Serving Cell Index, $N_{cells}$: Maximum Number of Serving Cells Set by Higher Layer Signaling (maxNrofServingCells);
s : CSI Report Configuration Index (reportConfigID), $M_s$: Maximum Number of CSI Report Configurations Set by Higher Layer Signaling (maxNrofCSI-ReportConfigurations).

A CSI priority for a CSI report may be determined through priority values $\text{Pri}_{iCSI}(y,k,c,s)$ of [Table 22]. Referring to [Table 22], a CSI priority value may be determined based on a type of channel information included in the CSI report, time-domain report characteristics (aperiodic, semi-persistent, or periodic) of the CSI report, a channel in which the CSI report is transmitted (PUSCH or PUCCH), a serving-cell index, and a CSI report configuration index. The CSI priority for the CSI report may be determined by comparing the priority values $\text{Pri}_{iCSI}(y,k,c,s)$ such that a CSI priority is higher for a CSI report having a lower priority value.

When a time for which channel information computation required for a CSI report indicated by the base station to the terminal occupies CPUs is a CPU occupation time, the CPU occupation time may be determined considering a type (report quantity) of channel information included in the CSI report, time-domain characteristics (aperiodic, semi-persistent, periodic) of the CSI report, a slot or a symbol occupied by higher layer signaling or the DCI indicating the CSI report, and some or all of a slot or a symbol occupied by an RS for channel state measurement.

Figure 9:
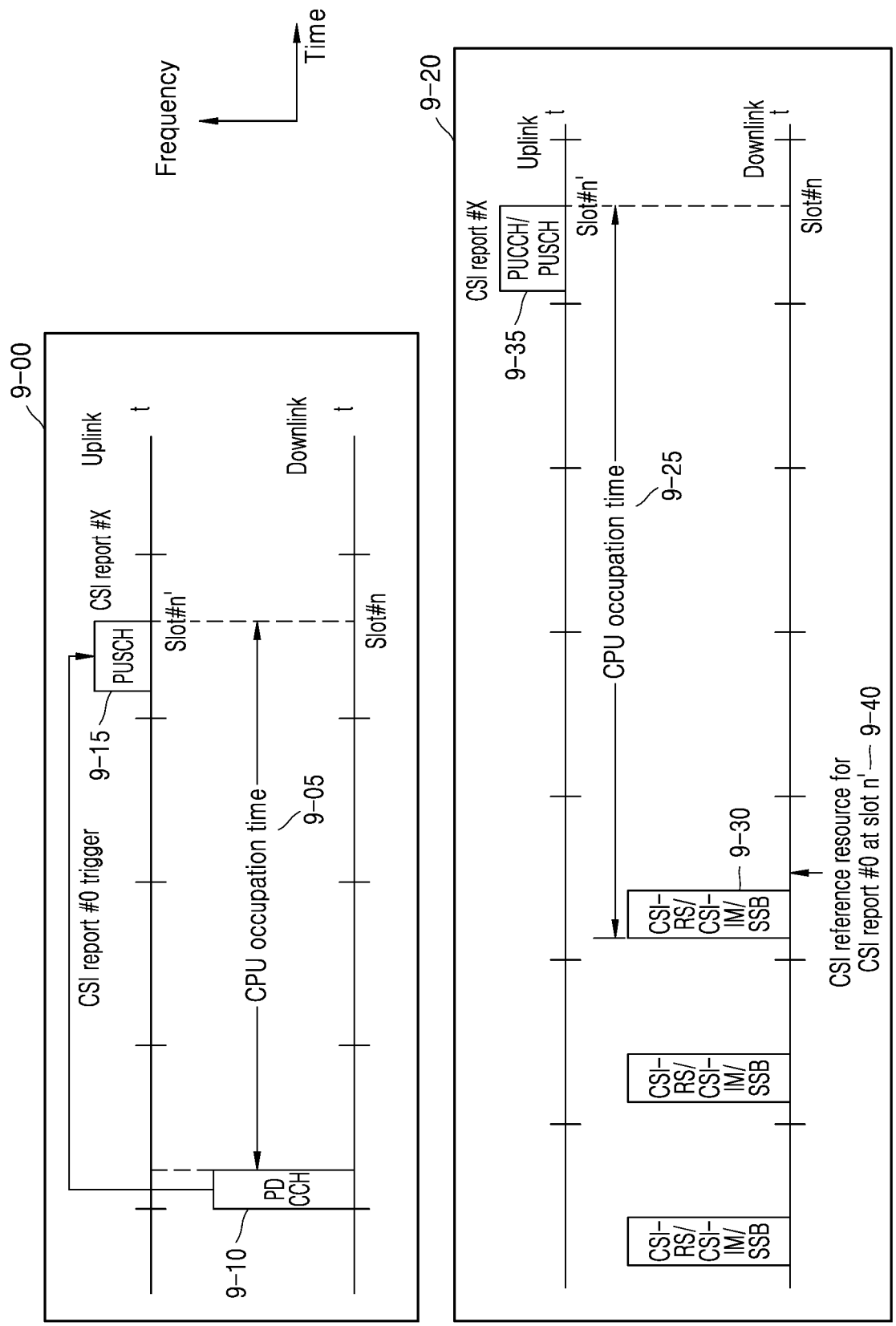
FIG. 9 illustrates an example of central processing unit (CPU) occupation time for a CSI report in which a report quantity included in the CSI report is not configured to 'none', according to some embodiments of the disclosure.

FIG. 9 illustrates an example of a CPU occupation time for a CSI report in which a report quantity included in the CSI report is not configured to 'none', according to some embodiments of the disclosure.

9-00 of FIG. 9 illustrates an example of a CPU occupation time for an aperiodic CSI report in which a report quantity included in the CSI report is not configured to 'none', according to some embodiments of the disclosure. When the base station indicates transmission of aperiodic CSI report #X in the uplink slot n' through DCI using DCI format 0_1, a CPU occupation time 9-05 for CSI report #X transmitted in the uplink slot n' may be defined as "from a symbol next to the last symbol occupied by a PDCCH 9-10 including DCI indicating aperiodic CSI report #0 to the last symbol occupied by a PUSCH 9-15 including the CSI report #X transmitted in the uplink slot n'".

9-20 of FIG. 9 illustrates an example of a CPU occupation time for a periodic or semi-persistent CSI report in which a report quantity included in the CSI report is not set to 'none', according to some embodiments of the disclosure. When the base station indicates transmission of periodic or semi-persistent CSI report #X in the uplink slot n' through higher layer signaling or DCI using DCI format 0_1 scrambled by an SP-CSI-RNTI, a CPU occupation time 9-25 for CSI report #X transmitted in the uplink slot n' may be defined as "from the first symbol of the first transmitted CSI-RS/CSI-IM/SSB resource corresponding to the last CSI-RS/CSI-IM/SSB occasion 9-35 among CSI-RS/CS-IM/SSB occasions for the CSI report #X transmitted in the uplink slot n' to the last symbol occupied by a PUCCH or PUSCH 9-35 including the CSI report #X transmitted in the uplink slot n'. Exceptionally, when the base station indicates a semi-persistent CSI report through DCI such that the terminal performs a first CSI report of semi-persistent CSI report #X, a CPU occupation time for the first CSI report may be defined as "from a symbol next to the last symbol occupied by a PDCCH including DCI indicating the semi-persistent CSI report #X to the last symbol occupied by a PUSCH including the first CSI report. In this way, time-domain operation causality of the terminal may be guaranteed based on a point in time at which a CSI report is indicated and a point in time at which a CPU occupation time starts.

For example, the CPU occupation time may follow a rule as shown in [Table 23].

quantity included in the CSI report is set to 'none', according to some embodiments of the disclosure. When the base station indicates transmission of aperiodic CSI report #X in the uplink slot n' through DCI using DCI format 0_1, a CPU occupation time 10-05 for CSI report #X transmitted in the uplink slot n' may be defined as "from a symbol next to the last symbol occupied by a PDCCH 10-10 including DCI indicating aperiodic CSI report #0 to a symbol in which CSI computation ends". The above-described symbol in which CSI computation ends may mean the last symbol among symbols after a CSI computation time Z 10-15 of the last symbol occupied by a PDCCH including DCI indicating the CSI report #0 and symbols after a CSI computation time Z' 10-25 of the last symbol of the latest CSI-RS/CSI-IM/SSB occasion 10-20 for the CSI report #0 transmitted in the uplink slot n'.

Figure 10:
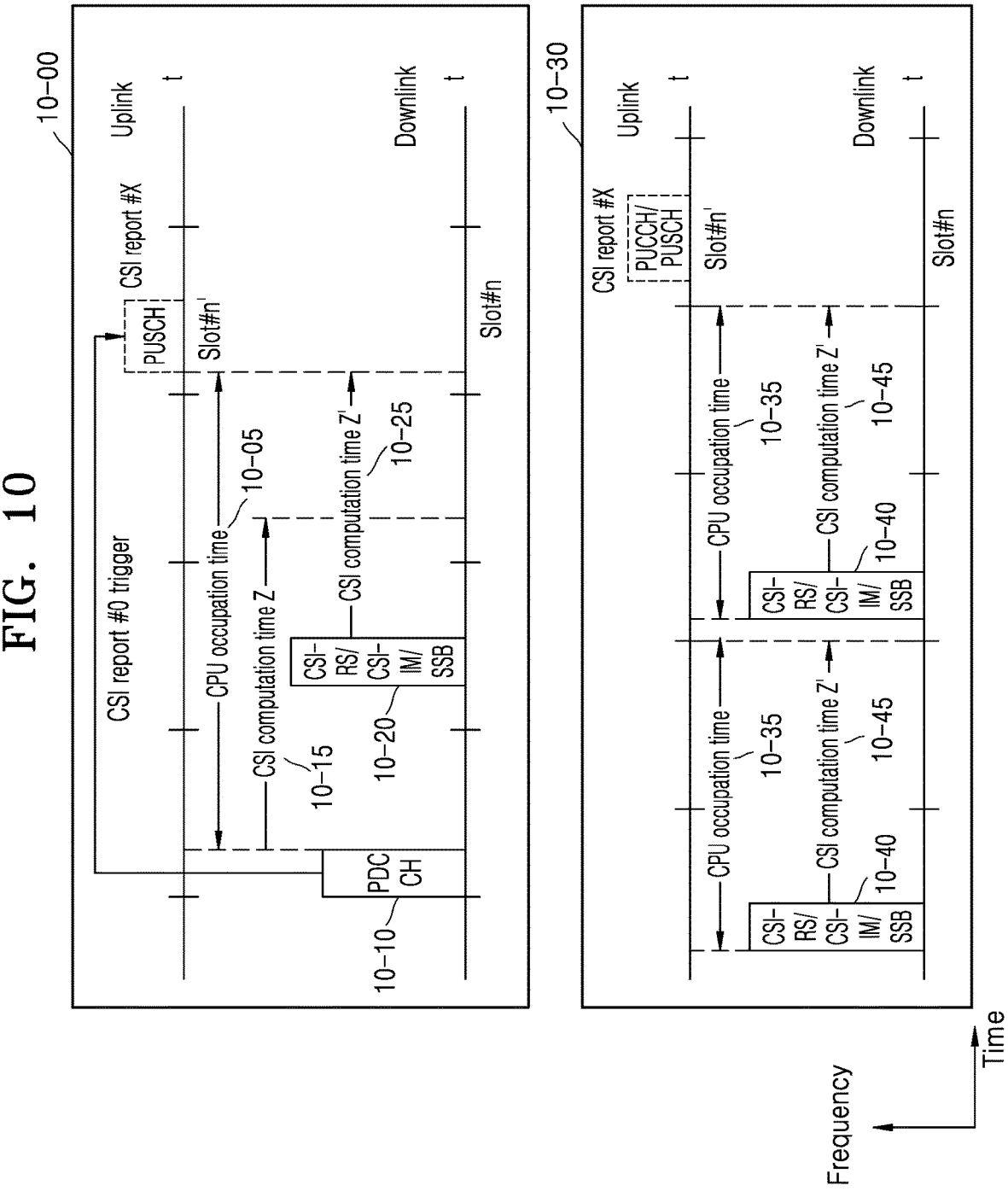
FIG. 10 illustrates an example of CPU occupation time for a CSI report in which a report quantity included in the CSI report is configured to 'none', according to some embodiments of the disclosure.

10-30 of FIG. 10 illustrates an example of a CPU occupation time for a periodic or semi-persistent CSI report in which a report quantity included in the CSI report is set to 'none', according to some embodiments of the disclosure. When the base station indicates transmission of periodic or semi-persistent CSI report #X in the uplink slot n' through higher layer signaling or DCI using DCI format 0_1 scrambled by an SP-CSI-RNTI, a CPU occupation time 10-35 for CSI report #X transmitted in the uplink slot n' may be defined as "from the first symbol of the first transmitted CSI-RS/CSI-IM/SSB resource corresponding to each CSI-RS/CSI-IM/SSB occasion 10-40 for CSI report #X trans-

TABLE 23

For a CSI report with CSI-ReportConfig with higher layer parameter reportQuantity not set to 'none', the CPU(s) are occupied for a number of OFDM symbols as follows:
A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
An aperiodic CSI report occupies CPU(s) from the first symbol after the PDCCH triggering the CSI report until the last symbol of the PUSCH carrying the report.
An initial semi-persistent CSI report on PUSCH after the PDCCH trigger occupies CPU(s) from the first symbol after the PDCCH until the last symbol of the PUSCH carrying the report.

FIG. 10 illustrates an example of a CPU occupation time for a CSI report in which a report quantity included in the CSI report is set to 'none', according to some embodiments of the disclosure.

10-00 of FIG. 10 illustrates an example of a CPU occupation time for an aperiodic CSI report in which a report mitted in the uplink slot n' to symbols after a CSI computation time Z' 10-45 of the last symbol of the last transmitted CSI-RS/CS-IM/SB resource".

For example, the CPU occupation time may follow a rule as shown in [Table 24].

TABLE 24

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:
A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z_3'$ symbols after the last symbol of the latest one of the CSI-RS/SSB resource for channel measurement for L1-RSRP computation in each transmission occasion.
An aperiodic CSI report occupies CPU(s) from the first symbol after the PDCCH triggering the CSI report until the last symbol between $Z_3$ symbols after the first symbol after the PDCCH triggering the CSI report and $Z_3'$ symbols after the last symbol of the latest one of each CSI-RS/SSB resource for channel measurement for L1-RSRP computation.

In an unlicensed band (e.g., 5 GHz), a communication device (base station or terminal) which is to perform communication may perform a channel access procedure or Listen before Talk (LBT) before signal transmission, and perform signal transmission according to a result of the channel access procedure. For example, when the unlicensed band is determined to be in an idle state as the result of the channel access procedure, the communication device may transmit a signal, but when the unlicensed band is determined not to be in the idle state, the communication device may not be able to transmit a signal.

The channel access procedure may include measuring, by the communication device, a strength of a signal received through the unlicensed band for a time calculated according to a set or predefined rule and comparing the strength of the signal with a predefined threshold value or a threshold value calculated by a function including at least one parameter among a channel bandwidth, a bandwidth of a signal in which a transmission signal is transmitted, and/or a strength of a transmission power, thus determining the idle state of the unlicensed band.

For example, the communication device may measure a strength of a signal received for X μs (e.g., 16 μs or 25 μs) immediately before a point in time to transmit a signal, and when the measured strength of the signal is less than a predefined or calculated threshold value T (e.g., −72 dBm), the communication device may determine that the unlicensed band is in the idle state, and transmit the signal. A maximum time in which signal transmission is possible by occupying a channel after the channel access procedure may be restricted by a maximum channel occupancy time (MCOT) defined by a country, an area, and a frequency band for each unlicensed band. The above-described maximum time may also be restricted according to a type of the communication device (e.g., the base station or the terminal, or a master device or a slave device). For example, in Japan, in a 5 GHz unlicensed band, for the unlicensed band determined to be in the idle state after the channel access procedure, the base station or the terminal may occupy a channel and transmit a signal without performing an additional channel access procedure for a maximum time of 4 ms.

More specifically, the channel access procedure of the base station or the terminal in the NR system may be roughly classified into four categories. For example, there may be a first category in which the channel access procedure is not performed, a second category in which the channel access procedure is performed without random backoff, a third category in which the channel access procedure is performed through random backoff in a contention window of a fixed size, and a fourth category in which the channel access procedure is performed through random backoff in a contention window of a variable size. The channel access procedure category may be classified into the following channel access procedure types:

Type 1: transmit an up/downlink signal or channel after execution of a channel access procedure during a variable time;

Type 2: transmit an uplink/downlink signal or channel after execution of a channel access procedure during a fixed time; and Type 3: transmit a downlink or uplink signal or channel without execution of a channel access procedure According to an embodiment of the disclosure, a third category and a fourth category for Type 1, a second category for Type 2, and a first category for Type 3 may be examples. For Type 2 or the second category in which the channel access procedure is performed for a fixed time, it may be classified into one or more types according to the fixed time during which the channel access procedure is executed. For example, Type 2 may be classified into a type (Type 2-1) in which the channel access procedure is executed for a fixed time of A μs (e.g., 25 μs) and a type (Type 2-2) in which the channel access procedure is executed for a fixed time of B μs (e.g., 16 μs).

The base station or the terminal that is to perform signal transmission in the unlicensed band may determine a channel access procedure type (or scheme) according to a type of a signal or channel to be transmitted. For example, the base station may perform the channel access procedure of Type 1 when the base station transmits a downlink signal including a downlink data channel in the unlicensed band. When the base station transmits a downlink signal or channel that does not include a downlink data channel, for example, a synchronization signal or a downlink control channel, in the unlicensed band, the base station may execute the channel access procedure of Type 2 and transmit the signal or channel.

In this case, a scheme of the channel access procedure may be determined according to a transmission length of a signal or channel to be transmitted in the unlicensed band or a duration or a length of a period in which the unlicensed band is used by being occupied. In general, in Type 1, the channel access procedure needs to be executed for a longer time than execution of the channel access procedure in Type 2. Thus, when the base station or the terminal transmits a signal during a short time period or a reference time (e.g., X ms or Y symbol) or less, the base station or the terminal may perform the channel access procedure of Type 2. On the other hand, when the base station or the terminal transmits a signal during a long time period or the reference time (e.g., X ms or Y symbol) or more, the base station or the terminal may perform the channel access procedure of Type 1. That is, a time in which the unlicensed band is used by being occupied may vary with the channel access procedure type of the unlicensed band.

In various embodiments of the disclosure, a parameter value (e.g., a defer duration corresponding to a determined channel access priority p, a set of contention window values or sizes $CW_p$, a minimum value $CW_{min,p}$ and a maximum value $CW_{max,p}$ of a contention window, and a maximum channel-occupiable duration $T_{mcot,p}$) corresponding to the channel access priority type may be determined as shown in [Table 25]. [Table 25] shows an example of a parameter for a channel access priority type for a downlink.

For example, the base station which is to transmit a downlink signal in the unlicensed band may execute the channel access procedure for the unlicensed band during a minimum time of $T_f+m_p*T_{sl}$ (e.g., a defer duration). When the base station is to execute the channel access procedure according to a channel access priority type 3 (p=3), for a size of a defer duration, $T_f+m_p*T_{sl}$, required for execution of the channel access procedure, a size of $T_f+m_p*T_{sl}$ may be set using $m_p=3$. Herein, $T_f$ is fixed to 16 us, in which the first time $T_{sl}$ needs to be an idle state and during the remaining time $T_f-T_{sl}$ after the time $T_{sl}$ in the time $T_f$, the base station may not execute the channel access procedure. In this case, even when the base station executes the channel access procedure in the remaining time $T_f-T_{sl}$, a result of the channel access procedure may not be used. That is, the time $T_f-T_{sl}$ may be a time that defers execution of the channel access procedure in the base station.

When the unlicensed band is determined to be in the idle state during $m_p*T_{sl}$, N=N−1. N may be selected as a random integer among the contention window values $CW_p$ at 0 and a point in time when the channel access procedure is executed. For the channel access priority type 3, a minimum contention window value and a maximum contention window value may be 15 and 63, respectively. When the unlicensed band is determined to be in the idle state in the defer duration and an additional duration in which the channel access procedure is executed, the base station may transmit a signal in the unlicensed band during a time $T_{mcot,p}$ of about 8 ms. While the description has been made based on a downlink channel access priority class for convenience thereof, the channel access priority class of [Table 25] may be equally used for an uplink or a separate channel access priority class for uplink transmission may be used.

TABLE 25

| Channel Access Priority Class (p) | $m_p$ | $CW_{min,p}$ | $CW_{max,p}$ | $T_{mcot,p}$ | Allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the NR system, one carrier may use a maximum frequency band of about 100 MHz in a frequency band of about 7 GHz or lower. In this case, one carrier may use a maximum frequency band of about 400 MHz in a frequency band of about 7 GHz or higher or an ultra-high frequency band (mm Wave). A partial unlicensed band (e.g., an unlicensed band near 5 GHz) may be divided into 20 MHz channels, and by using each channel divided in the unit of 20 MHz, various communication devices may execute the channel access procedure. Thus, the NR system for performing communication in the unlicensed band by using a wideband (e.g., a bandwidth wider than a bandwidth of about 20 MHz) may execute the channel access procedure in the unit of 20 MHz, thereby fairly using the unlicensed band with other devices and/or systems. In other words, in the base station and the terminal which perform communication by using an unlicensed carrier or cell or a bandwidth part of the carrier or cell, when the bandwidth of the carrier or cell or a bandwidth of the bandwidth part is greater than about 20 MHz, the bandwidth or the bandwidth part (hereinafter, referred to as the bandwidth part) may be divided into one or more subbands, and the channel access procedure may be performed in the unit of a subband or subband group. In this case, the subband may be divided based on the size of the carrier bandwidth or the bandwidth part.

For example, the base station may divide the bandwidth part into a plurality of LBT subbands based on the size of the bandwidth part, which is set for the terminal. That is, a bandwidth part of about 80 MHz may be divided into four 20 MHz-based LBT subbands. The size of the LBT subband may be equal to the size of the unlicensed-band channel or may be a multiple thereof. The size of the LBT subband may be set through a higher layer signal. The size of the LBT subband may be defined as the size of the bandwidth or the number of PRBs. That is, the size of the LBT subband may be equal to the size of a 5 GHz unlicensed-band channel, about 20 MHz, or may be a multiple thereof, about 40 MHz or about 80 MHz. In another example, the size of the LBT subband may be defined as X PRBs, in which a bandwidth corresponding to the X PRBs may be equal to or less than the size of the unlicensed-band channel, a bandwidth of about 20 MHz. Similarly, the size of the LBT subband may be defined as Y and/or Z PRBs corresponding to a bandwidth that is the same as or smaller than a bandwidth of about 40 MHz or 80 MHz. In this case, X, Y, and Z for each bandwidth may be defined in advance between the base station and the terminal. The size of at least one of LBT subbands may be different from the sizes of the other LBT subbands. For example, when the size of the carrier bandwidth or the bandwidth part is 50 MHz, the carrier bandwidth or the bandwidth part may be divided into three LBT subbands. The sizes of the three LBT subbands may be about 20 MHz, about 20 MHz, and about 10 MHz, respectively, or about 10 MHz, about 20 MHz, and about 20 MHz, respectively. The number of LBT subbands and/or the size of each LBT subband is merely an example, and various examples may be possible. That is, the carrier bandwidth or the bandwidth part of 50 MHz may be divided into LBT subbands of about 40 MHz and LBT subbands of about 10 MHz. In the foregoing example, the size of each LBT subband may be expressed as the number of PRBs.

Figure 11:
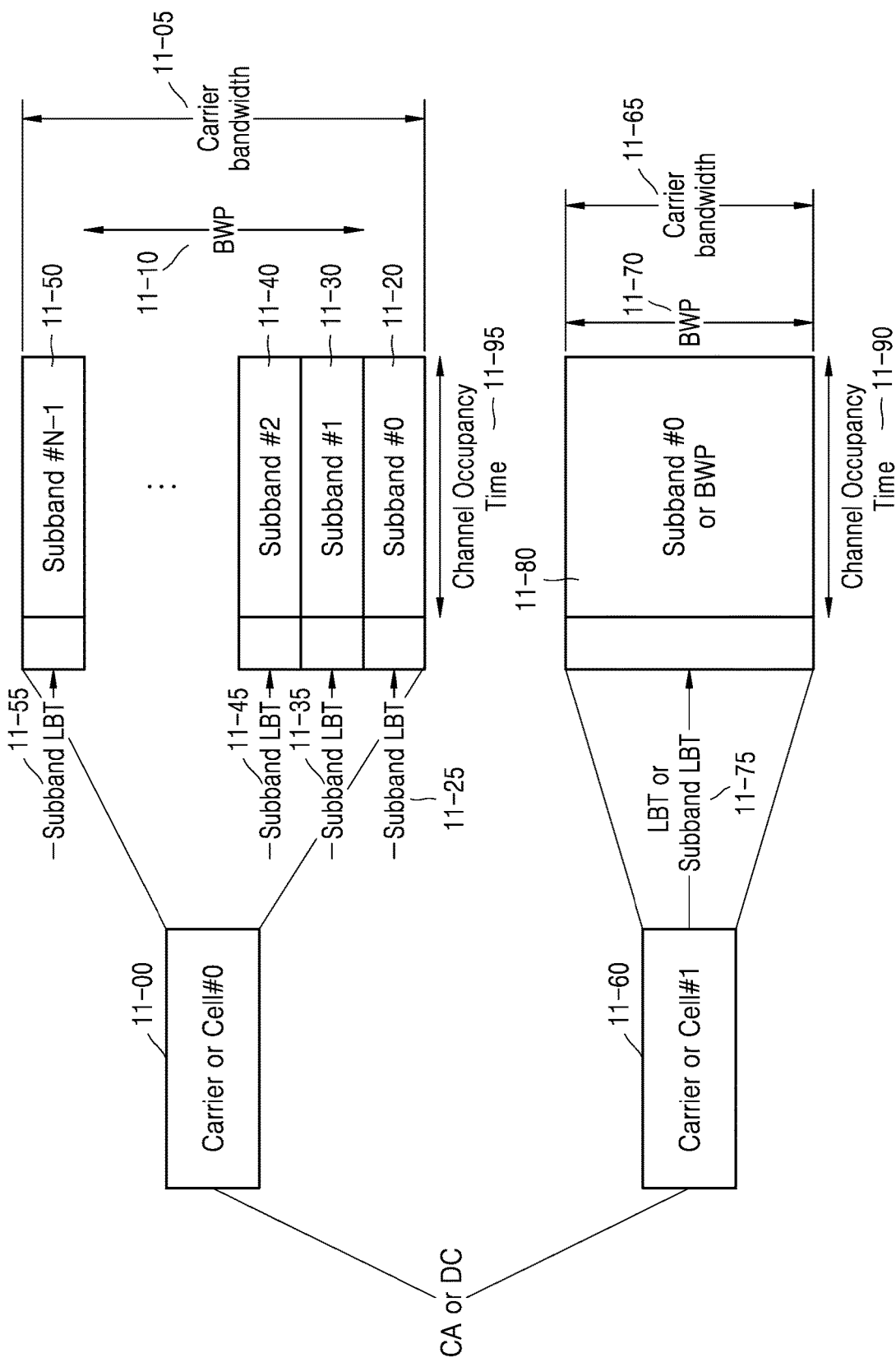
FIG. 11 illustrates an example in which a listen before talk (LBT) sub-band is divided in a wireless communication system, according to various embodiments of the disclosure.

This is described below in more detail with reference to FIG. 11. FIG. 11 illustrates an example in which an LBT sub-band is divided in a wireless communication system, according to various embodiments of the disclosure.

FIG. 11 may be a view showing a case where the terminal performs communication with the base station through two unlicensed carriers or cells 11-00 and 11-60 (hereinafter, referred to as cell #0 and cell #1). In this case, sizes of carrier bandwidths 11-05 and 11-65 of cell #0 and cell #1 may be the same as or different from each other. Moreover, the terminal may be configured with bandwidth parts 11-10 and 11-70 that are the same as or smaller than bandwidths 11-05 and 11-65 of cell #0 and cell #1. In this case, configuration information (e.g., the size of a bandwidth part) of the bandwidth parts 11-10 and 11-70 may be the same as or different from each other. The base station may divide the carrier bandwidth 11-05 of cell #0 into N LBT subbands, in which the carrier bandwidth 11-65 or the bandwidth part 11-70 of cell #1 may not be separately divided into LBT subbands or may be divided into one LBT subband for execution of the channel access procedure. In this case, the base station may divide the bandwidth part 11-10 of the terminal into M LBT subbands in cell #0. The base station may execute a channel access procedure including 11-25, 11-35, 11-45, and 11-55 and for an LBT subband in cell #0 11-00 and a channel access procedure 11-75 for subband #0 or the carrier or bandwidth part 11-70 in cell #1 11-60, and may perform communication through an LBT subband determined to be in the idle state. Thus, as a resource region that may be transmitted and received by the terminal may change according to a result of the channel access procedure for each LBT subband of the base station, the terminal needs to receive the result of the channel access procedure for each subband, executed by the base station, and in this way, the terminal may correctly determine a frequency resource region for uplink/downlink data channel transmission/reception.

To this end, the base station may transmit the result of the channel access procedure to the terminal through a downlink control channel. As the result of the channel access procedure of the base station is information commonly applied to all terminals configured with a bandwidth part including an LBT subband, the base station transmits the result of the channel access procedure for each subband through cell-common or group-common (GC) DCI, thereby minimizing signaling necessary for transmission of the foregoing information to the terminals. In this case, the result of the channel access procedure of the base station may be transmitted to the terminal through terminal (UE)-specific DCI.

In various embodiments of the disclosure, information indicating the result of the channel access procedure of the base station may be referred to as 'LBT result information'. In this case, the LBT result information may be defined for each LBT subband, and may include information indicating the result of the channel access procedure for each LBT subband. The LBT result information may also be defined for each carrier or cell, and may include information indicating the result of the channel access procedure for each carrier or cell. When the carrier or cell includes a plurality of subbands, the LBT result information may also be defined for each carrier or cell and each LBT subband, and may include information indicating the result of the channel access procedure for each carrier or cell and each LBT subband.

The base station may transmit the result of the channel access procedure for each LBT subband to the terminal by using a bitmap. For example, the result of the channel access procedure for cell #0 11-00 including four LBT subbands may be transmitted to the terminal through a 4-bit bitmap that may be configured in an order sequentially from an LBT subband 11-20 having a low LBT subband index to an LBT subband 11-50 having a high LBT subband. Each bit may indicate the result of the channel access procedure of the base station for each LBT subband. For example, bit 0 may mean that the LBT subband is not in the idle state, and bit 1 may mean that the LBT subband is in the idle state. The foregoing bit value is an example, and may be set reversely. Transmission of the result of the channel access procedure for each LBT subband to the terminal may be represented by transmission to the terminal of whether the base station occupies the LBT subband (bit 1) or does not occupy the LBT subband (bit 0) or transmission to the terminal of whether the base station transmits a downlink signal through the LBT subband (bit 1) or does not transmit the downlink signal through the LBT subband (bit 0). In this case, transmission of the result of the channel access procedure for each LBT subband to the terminal may be represented by transmission to the terminal of whether the base station transmits a downlink signal through the LBT subband, but the downlink signal is punctured (bit 0) or the downlink signal is rate-matched to the LBT subband (or not transmitted) (bit 1). That is, when the base station transmits the result of the channel access procedure for each LBT subband to the terminal, it may mean that the base station may provide to the terminal, information that allows the terminal to avoid receiving a control signal, a control channel, or a data channel in an LBT subband failing in channel access. Meanwhile, transmission of the result of the channel access procedure for each LBT subband to the terminal through a bitmap is an example, and the base station may represent a combination of results of the channel access procedure for respective LBT subbands as a bit string and transmit a result among them to the terminal. When channel access using consecutive LBT subbands is allowed, for example, channel access using inconsecutive LBT subbands such as LBT subbands #0 and #2 is not allowed, transmission of the combination of the results of the channel access procedure for respective LBT subbands to the terminal as a bit string may minimize bits required for information transmission, when compared to transmission of the result of the channel access procedure to the terminal through the bitmap.

The base station may transmit information about channel occupancy times 11-90 and 11-95 of the base station, together with the result of the channel access procedure, to the terminal through the downlink control channel. Herein, the channel occupancy time may be a time during which the base station may occupy an unlicensed band, occupation of which is initiated after execution of the channel access procedure, without executing an additional channel access procedure. channel occupancy time information may be expressed as a channel occupancy start time and/or a channel occupancy end time of the base station or a corresponding slot number and/or a symbol number, a slot index and/or a symbol index corresponding to the channel occupancy start time and/or the channel occupancy end time, or the number of slots or symbols from a slot or symbol in which a downlink control channel for transmitting the channel occupancy time information is transmitted to a channel occupancy end slot or symbol. Meanwhile, the base station may transmit at least slot format indicator information for a slot in the channel occupancy time, and the terminal may implicitly determine the channel occupancy time information of the base station from the slot format indicator information. The channel occupancy time information and the LBT result information may be transmitted through the same downlink control channel or different downlink control channels.

Meanwhile, an uplink signal or channel transmitted in a channel occupancy time of the base station starting channel occupancy after execution of a channel access procedure of Type 1 may be transmitted after execution of a channel access procedure of Type 2 or Type 3.

In the following disclosure, a time period in which the base station or the terminal is allowed to transmit and receive a radio signal through the above-described channel access procedure, etc. will be defined as a "channel occupancy duration", which may be replaced with other similar terms such as a non-empty symbol (slot/duration), an occupied duration, etc., in actual application thereof. On the other hand, a time period in which the base station or the terminal is prohibited from transmitting and receiving a radio signal through the above-described channel access procedure, etc. will be defined as a "channel non-occupancy duration", which may be replaced with other similar terms such as an empty symbol (slot/duration), a non-occupied duration, etc., in actual application thereof. The channel occupancy duration and the channel non-occupancy duration may be exclusive to each other in a frequency resource in at least the same unit (e.g., a unit frequency resource for one channel access procedure for one LBT or subband LBT, which means that in the at least unit frequency resource, a resource that is not the channel occupancy duration may be understood as a channel non-occupancy duration and a resource that is not the channel non-occupancy duration may be understood as a channel occupancy duration.

In the disclosure, by providing methods for the base station or the terminal, such as determining a valid CSI report according to channel occupancy or channel non-occupancy, determining a CSI reference resource, determining a CPU occupation time, etc., the efficiency of indication and channel state measurement for CSI reports of the base station and the terminal may be improved.

Hereinafter, embodiments of the disclosure are described in detail with reference to the accompanying drawings. In a description of the disclosure, when determined to make the subject matter of the disclosure unnecessarily unclear, the detailed description of the related functions or structures may be skipped. The terms as used herein are defined considering the functions in the disclosure and may be changed according to the intention or practice of the user or operator. Therefore, the terms should be defined based on the overall disclosure.

While the foregoing examples have been described through multiple embodiments in the disclosure, they are not independent and one or more embodiments of the disclosure may be applied at the same time or in combination.

First Embodiment: Method for Determining Valid Downlink Slot and CSI Reference Resource According to Channel Occupancy or Channel Non-Occupancy In the first embodiment of the disclosure described below, a method for determining a valid downlink slot and a CSI reference resource according to channel occupancy or channel non-occupancy will be described.

As described above, when preemption for urgent communication in a licensed band is not considered, the base station may guarantee uplink/downlink occupancy at all times based on autonomous determination thereof. In this case, the base station and the terminal may assume a downlink slot $n-n_{CSI-ref}$ as a CSI reference resource for a CSI report executed in the uplink slot n'. In this case, the base station and the terminal may identify validity of the CSI reference resource based on the following conditions to determine whether the downlink slot is a valid downlink slot. That is, in this example, a slot satisfying both Condition 1 and Condition 2 may be determined as the valid downlink slot. When the downlink slot is determined not to be the valid downlink slot, the latest valid downlink slot among previous downlink slots may be assumed as the CSI reference resource.

Condition 1) The valid downlink slot needs to include a downlink symbol or a flexible symbol configured via at least one higher layer. That is, when all symbols in a certain slot are configured as uplink symbols, the slot may not be a valid downlink slot.

Condition 2) The valid downlink slot should not overlap with a measurement gap that is set for a certain terminal to perform measurement for a handover, etc. That is, the terminal may not determine a slot including at least one of OFDM symbols included in the measurement gap that is set for the terminal as the valid downlink slot.

Meanwhile, when channel occupancy is not guaranteed at all times due to the channel access procedure in the unlicensed band, or preemption for urgent communication in the licensed band is considered, up/downlink occupancy may not be guaranteed at all times. Also in this case, the base station and the terminal may assume a downlink slot $n-n_{CSI-ref}$ as a CSI reference resource for a CSI report executed in the uplink slot n'. Meanwhile, in this case, when the base station and the terminal determines whether the downlink slot is the valid downlink slot by determining validity of a CSI reference resource, taking channel occupancy uncertainty into account, additional conditions as well as Condition 1 and Condition 2 need to be considered.

One of the additional conditions for determining the valid downlink slot based on the channel occupancy uncertainty may be a correlation between the downlink symbol and the flexible symbol configured via a higher layer in the downlink slot and the channel occupancy duration.

Figure 12:
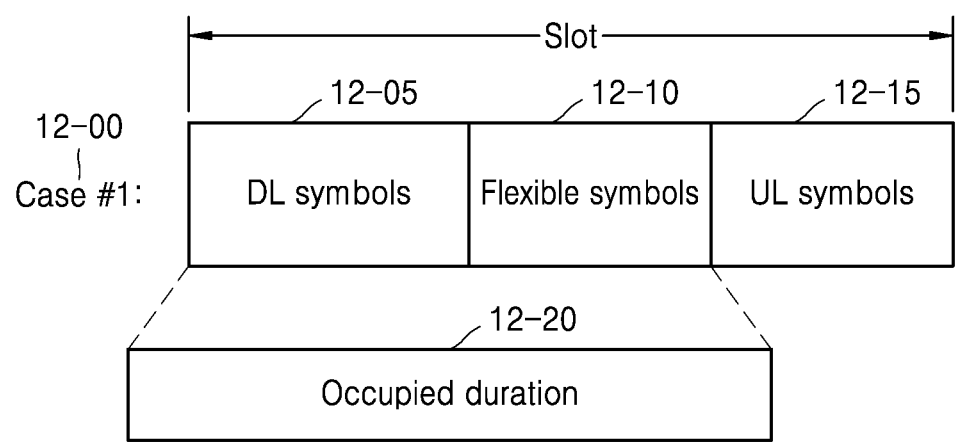
FIG. 12 illustrates an example of valid downlink slot determination based on a correlation between a downlink symbol and a flexible symbol, which are configured via a higher layer in a downlink slot, and a channel occupied duration, according to some embodiments of the disclosure.
Figure 12:
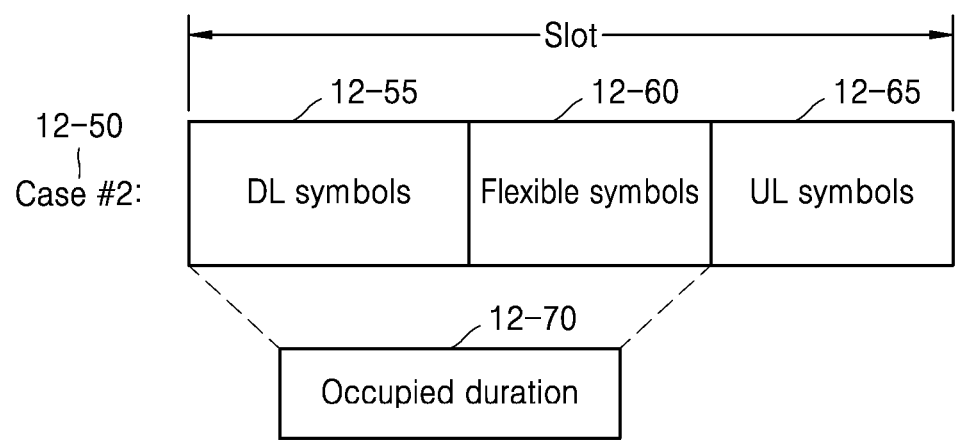

FIG. 12 illustrates an example of valid downlink slot determination based on a correlation between a downlink symbol and a flexible symbol, which are configured via a higher layer in a downlink slot, and a channel occupied duration, according to some embodiments of the disclosure.

Referring to FIG. 12, a relationship between downlink OFDM symbols 12-05 and 12-55 and flexible OFDM symbols 12-10 and 12-60 configured via a higher layer in one slot and channel occupancy durations 12-20 and 12-70 (or channel non-occupancy durations) may be defined as Condition 3 or Condition 4, and according to one of the methods, CSI report validity check for the slot may be performed.

Condition 3) When all of the downlink OFDM symbols 12-05 configured via the higher layer in one slot (or in addition, the flexible OFDM symbols 12-10) are included in the channel occupancy duration 12-20, the slot may be determined as the valid downlink slot, and when at least one of the downlink OFDM symbols 12-05 configured via the higher layer in one slot (or in addition, the flexible OFDM symbols 12-10) is included in the channel non-occupancy duration, the slot may not be determined as the valid downlink slot. This is intended not to perform a CSI report for a corresponding slot because the entire downlink transmission or a part thereof planned by the base station in the slot has become impossible in the above case.

Condition 4) When at least one of the downlink OFDM symbols 12-55 configured via the higher layer in one slot (or in addition, the flexible OFDM symbols 12-60) is included in the channel occupancy duration 12-70, the slot may be determined as the valid downlink slot, and when all of the downlink OFDM symbols 12-55 configured via the higher layer in one slot (or in addition, the flexible OFDM symbols 12-70) are included in the channel non-occupancy duration, the slot may not be determined as the valid downlink slot. This is intended not to perform a CSI report for a corresponding slot because downlink transmission planned by the base station in the slot becomes impossible in the above case.

Another one of the additional conditions for determining the valid downlink slot based on the channel occupancy uncertainty may be a correlation between a transmission/reception point in time of a CSI-RS or CSI-IM resource referred to for a CSI report and the channel occupancy duration.

Figure 13:
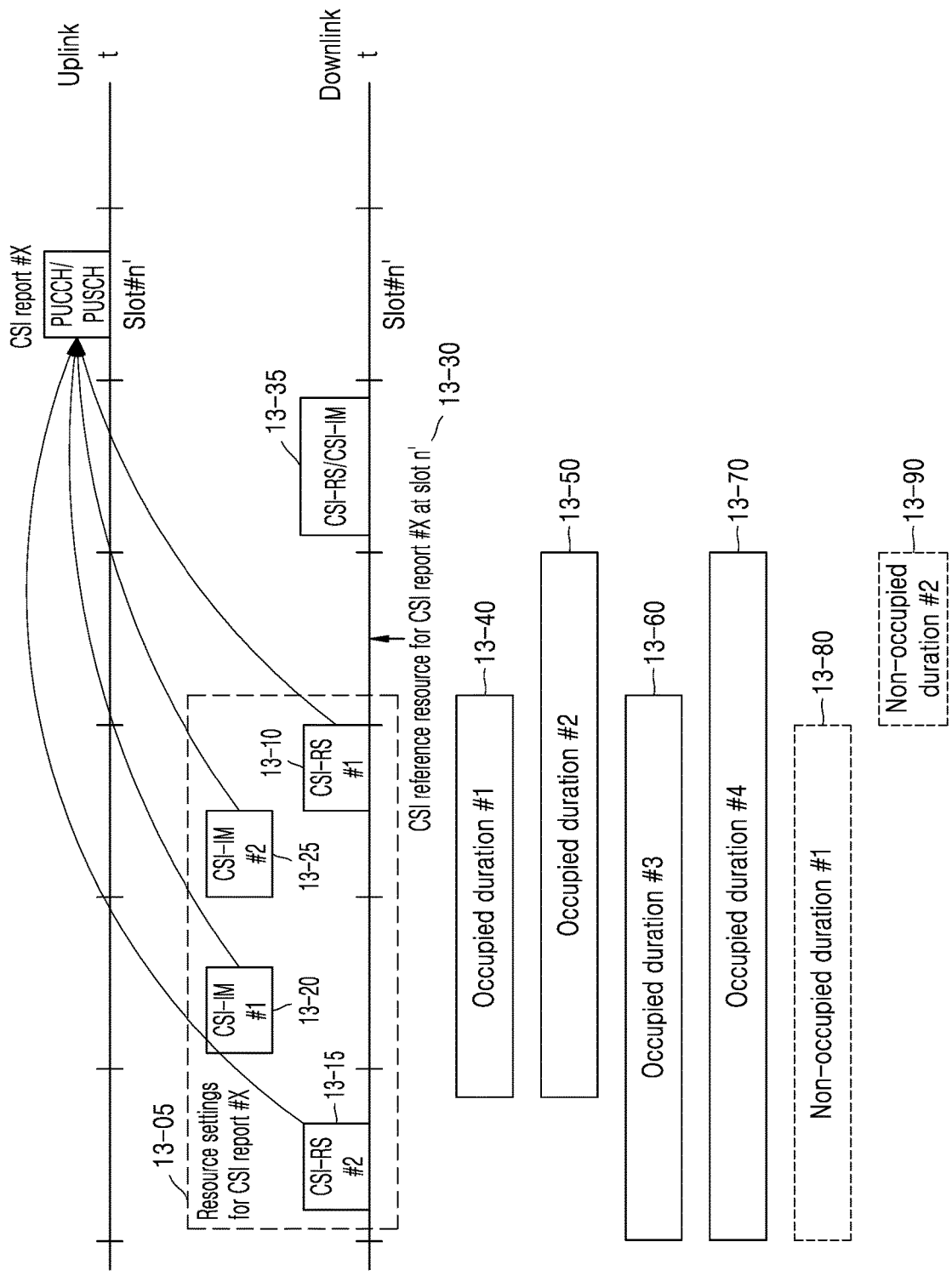
FIG. 13 illustrates another example of valid downlink slot determination according to some embodiments of the disclosure.

FIG. 13 illustrates another example of valid downlink slot determination according to some embodiments of the disclosure.

Referring to FIG. 13, for a CSI report 13-00 performed in the uplink slot n', a CSI reference resource 13-30 is assumed to be set at a time earlier than 13-00 according to the foregoing rules. The terminal may measure the latest CSI-RS or CSI-RS and CSI-IM pairs 13-10, 13-15, 13-20, and 13-25 transmitted prior to the CSI reference resource among CSI-RSs or CSI-RS/CSI-IM pairs 13-10, 13-15, 13-20, 13-25, and 13-35 indicated by at least one resource setting 13-05 referred to by the CSI report 13-00, thus generating CSI for the CSI report 13-00. In this case, when the base station and the terminal determine validity of the CSI reference resource by considering channel occupancy uncertainty and determine whether the downlink slot is the valid downlink slot, a relationship between transmission timings of the CSI-RSs or the CSI-RS/CSI-IM pairs 13-10, 13-15, 13-20, and 13-25 and the channel occupancy duration (or channel non-occupancy duration) may be defined by Condition 5 or Condition 6, and CSI report validity check for the slot may be performed according to one of the foregoing methods.

Condition 5) The terminal may determine the slot as the valid downlink slot when the latest CSI-RS or CSI-RS and CSI-IM pairs 13-10, 13-15, 13-20, and 13-25 transmitted prior to the CSI reference resource are transmitted among the CSI-RSs or CSI-RS/CSI-IM pairs 13-10, 13-15, 13-20, 13-25, and 13-35 indicated by at least one resource setting 13-05 referred to by the CSI report 13-00 in one slot. When the CSI-RSs or CSI-RS/CSI-IM pairs 13-10, 13-15, 13-20, and 13-25 are actually transmitted in the channel occupancy duration based on both Condition 3 and Condition 4, the slot may be determined as the valid downlink slot. This is intended to guarantee that the terminal may complete channel and interference measurement in a certain time period, taking characteristics of the unlicensed band temporarily occupying the channel into account.

Condition 6) The terminal may determine the slot as the valid downlink slot when at least one CSI-RS or at least one CSI-RS/CSI-IM pair are transmitted among the latest CSI-RSs or CSI-RS/CSI-IM pairs 13-10, 13-15, 13-20, and 13-25 transmitted before a CSI reference resource indicated by all resource settings 13-05 referred to by the CSI report 13-00 in one slot. When at least one CSI-RS or at least one CSI-RS/CSI-IM pair is actually transmitted in the channel occupancy duration based on both Condition 3 and Condition 4, the slot may be determined as the valid downlink slot. This is intended to consider a case where CRI indicates one CSI-RS resource to perform RSRP report for each CSI-RS resource and a case where CRI indicates a pair of CSI-RS/CSI-IM resources to perform a CSI report based on a pair of channel measurement/interference measurement. This is also intended to perform a CSI report by considering characteristics of the unlicensed band temporarily occupying the channel, when minimum CSI reporting requirements are established.

In the description of the disclosure, a flexible OFDM symbol configured via a higher layer may mean an OFDM symbol that may be to be indicated as one of a downlink OFDM symbol, an uplink OFDM symbol, or a gap by a slot format indicator (SFI) in the DCI. Meanwhile, in the description of the disclosure, validity of a CSI reference resource and/or a CSI report has been determined using a downlink symbol or a flexible symbol configured via a higher layer, but for the unlicensed band, there may not be fixed configuration for the downlink symbol, the flexible symbol, or the uplink symbol via the higher layer due to execution of the channel access procedure. In other words, the terminal may not receive configuration information for the downlink symbol, the flexible symbol, or the uplink symbol via a higher layer, but also in this case, the method of determining the valid downlink slot according to the disclosure may be applied. For example, the terminal may configure or determine all symbols as flexible symbols, and in this way, validity of a CSI reference resource and/or a CSI report may be determined through one of or a combination of a plurality of the above-described conditions.

In the above example, Conditions 3 through 6 may be used in combination of one or more thereof. That is, in the current example, the base station and the terminal may assume the slot that satisfies both Condition 1 and Condition 2 and additionally satisfies at least one of Condition 3 through Condition 6 (or a certain sub set such as satisfying Condition 3 and Condition 5 at the same time) as the valid downlink slot.

When there is no valid downlink slot for a CSI reference resource for CSI report setting in one serving cell, the terminal may skip a corresponding CSI report (a CSI report to be performed for the serving cell in the uplink slot n').

As described above, for CSI reporting transmitted in the uplink slot n', the latest valid downlink slot among the downlink slot $n-n_{CSI-ref}$ or slots previous thereto may be defined as a CSI reference resource. In this case, the terminal and the base station may skip a CSI report for the CSI reference resource according to some rules as below. In embodiments of the disclosure, skipping of the CSI report may be replaced with various expressions such as omission, dropping, or non-updating of the CSI report, but in order not to obscure the subject matter of the description, the redundant description will not be provided.

Rule 1) After an event such as CSI report setting or re-setting, SCell activation, BWP change/activation, semi-persistent CSI activation, etc., the terminal may perform a CSI report when at least one CSI-RS or a pair of CSI-RS/CSI-IM transmission/reception occasions exist at a time not later than the CSI reference resource, and otherwise, the terminal may skip a CSI report. This is intended to reduce the burden of the terminal, when a meaningless CSI report is issued depending on various setting or environment changes, by avoiding operating for that case.

Rule 2) When discontinuous reception (DRX) is set such that the terminal performs reception only in a DRX active time, the terminal may perform a CSI report when at least one CSI-RS or a pair of CSI-RS/CSI-IM transmission/reception occasions exist in the DRX active time; otherwise, the terminal may skip a CSI report. This is intended to guarantee an idle time of the terminal, regardless of a CSI report in a DRX non-active time.

Rule 3) In CSI feedback calculation, for the terminal, it may be guaranteed that a non-zero power (NZP) CSI-RS resource for channel measurement and CSI-IM for interference measurement or NZP CSI-RS for interference measurement do not overlap. This is intended uniformly maintain channel and interference measurement complexity of the terminal for a CSI report.

Rule 4) When some of OFDM symbols that transmit CSI-RS or CSI-IM associated with a certain CSI report are included in a channel non-occupancy duration, the terminal may skip the CSI report (or may not select CRI indicating the CSI-RS or CSI-IM included in the channel non-occupancy duration or may not update CRI-related CSI). This is intended to reduce the burden of the terminal, by preventing the associated CSI report from being performed when a channel occupancy duration is not secured for transmission of CSI-RS or CSI-IM due to the channel access procedure.

Rule 5) When all of the OFDM symbols that transmit the CSI-RS or CSI-IM associated with the certain CSI report are included in the channel non-occupancy duration and thus there are no available CSI-RS and CSI-IM prior to the CSI reference resource of the CSI report, the terminal may skip the CSI report (or skip the CSI report when there are no CSI-RS and CSI-IM in the channel occupancy duration including the CSI reference resource prior to the CSI reference resource of the CSI report). This is intended to reduce the burden of the terminal, by preventing the related CSI report from being performed when a channel occupancy duration is not secured for transmission of CSI-RS or CSI-IM due to the channel access procedure and thus the CSI may not be obtained.

Rule 6) When the CSI reference resource of the certain CSI report is not included in the channel occupancy duration, the CSI report may be skipped. This is intended to reduce the burden of the terminal by preventing the CSI report from being performed for a resource that is not fixed as the channel occupancy duration due to the channel access procedure.

When Rules 1 through 6 are applied, the base station and the terminal may determine whether to skip the CSI report based on a combination of some rules. For example, the terminal may apply Rules 1 through 3 at all times according to independent conditions such as CSI report setting or re-setting, SCell activation, BWP change/activation, semi-persistent CSI activation, DRX setting, etc. The terminal may additionally apply at least one of Rules 4 through 6 according to determination of the channel occupancy duration or the channel non-occupancy duration. In particular, Rules 4 through 6 may be applied together with interrelation. For example, it may be agreed that when a CSI reference resource 13-30 of a certain CSI report 13-00 and CSI-RS/CSI-IM resources 13-10, 13-15, 13-20, and 13-25 transmitted before the CSI reference resource 13-30 are not included in X channel occupancy durations (or X ms/symbol/slot) due to simultaneous application of Rules 5 and 6, the terminal skips the CSI report. This may be understood as when the CSI reference resource 13-30 of the certain CSI report 13-00 and the CSI-RS/CSI-IM resources 13-10, 13-15, 13-20, and 13-25 transmitted before the CSI reference resource 13-30 are included in the X channel occupancy durations (or X ms/symbol/slot) as in 13-70, the terminal performs a corresponding CSI report. In this example, X may be a constant that is preset or configured via a higher layer, such as 1 or 2. This is intended to reduce the burden of the terminal by preventing the CSI report from being performed for a resource that is not fixed as the channel occupancy duration due to the channel access procedure. The combination of Rules 4 through 6 may be configured in various ways, but all possible examples will not be listed to avoid obscuring the subject matter of the description.

While the channel occupancy duration or the channel non-occupancy duration resulting from the channel access procedure of the unlicensed band in Rules 4 through 6 has been described as an application condition, this may be extended to various cases such as channel non-use due to a GC PDCCH or channel non-use due to preemption for urgent communication.

In the description of the disclosure, when the "terminal is guaranteed with Condition A" may be interpreted as various meanings such as "Condition A is not expected not to be satisfied", "Operation related to Condition A is not performed when Condition A is not satisfied", "Indication of the base station related to Condition A is ignored when Condition A is not satisfied", etc. In addition, not to obscure the subject matter of the description, the description will not be repeated.

Second Embodiment: Method of Calculating CPU Occupation According to Channel Occupancy or Channel Non-Occupancy The second embodiment of the disclosure may provide a CPU occupation method according to channel occupancy or channel non-occupancy.

Figure 14:
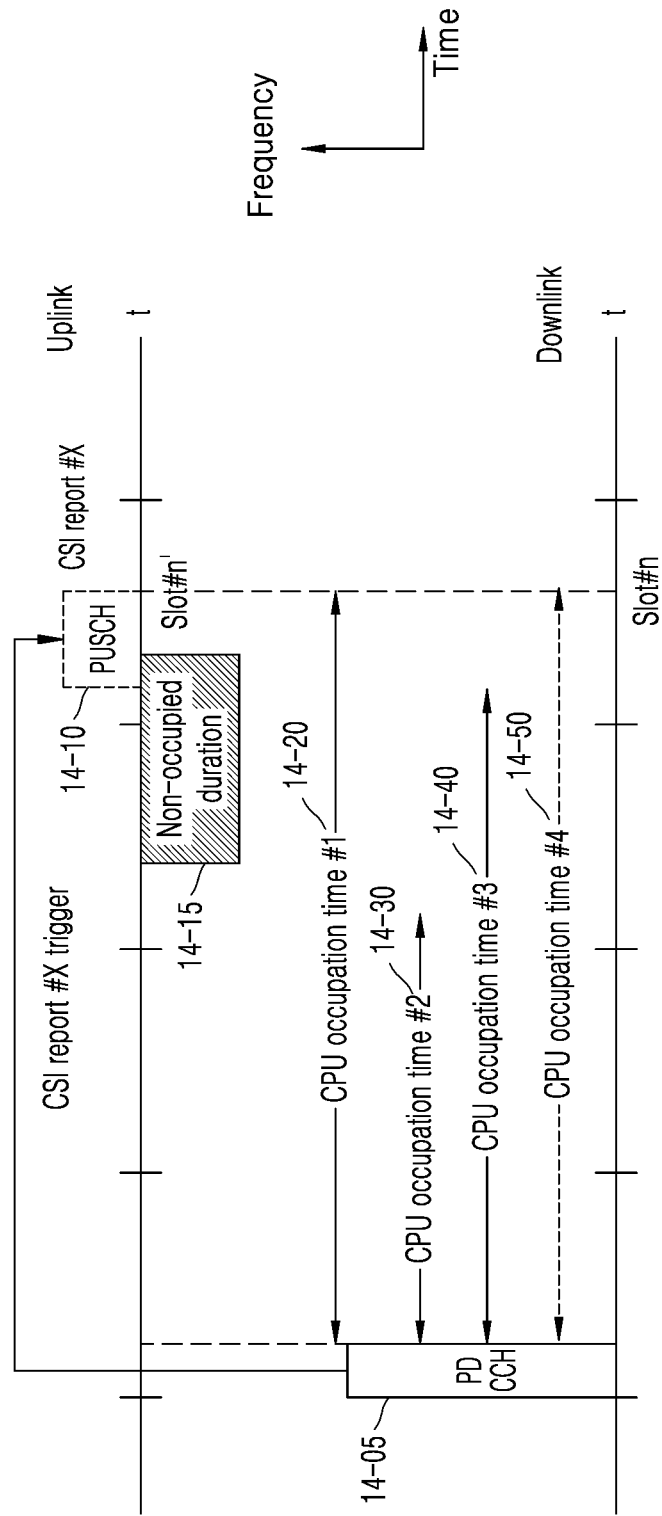
FIG. 14 illustrates an example of CPU occupation computation according to some embodiments of the disclosure.

FIG. 14 illustrates an example of CPU occupation calculation according to some embodiments of the disclosure.

FIG. 14 illustrates a CPU occupation time for an aperiodic CSI report in which a report quantity included in CSI report #X is not set to 'none'. When the base station indicates transmission of aperiodic CSI report #X in the uplink slot n' through DCI 14-05 using DCI format 0_1, one of the following various CPU occupation time calculation methods may be applied according to whether an uplink/downlink in which a PUSCH or CSI-RS/CSI-IM related to the CSI report #X is a licensed band or an unlicensed band or whether channel occupancy is possible at all times or conditional channel occupancy is possible (i.e., when a certain frequency/time resource may be a channel occupancy duration and a channel non-occupancy duration).

Method 1) When channel occupancy for the uplink/downlink is possible at all times in the licensed band, CPU occupation time #1 14-20 for CSI report #X 14-10 transmitted in the uplink slot n' may be defined as "from a symbol next to the last symbol occupied by a PDCCH 14-05 including DCI indicating aperiodic CSI report #X to the last symbol occupied by a PUSCH 14-15 including the CSI report #X transmitted in the uplink slot n'".

Method 2) Method 2 is a method for calculating a CPU occupation time for a case where a part of an uplink resource for an aperiodic CSI report in which reportQuantity is not set to 'none' overlaps with the channel non-occupancy duration. When the entire PUSCH resource 14-10 or a part thereof for CSI report #X transmitted in the uplink slot n' overlaps with a channel non-occupancy duration 14-15 due to the channel access procedure, CPU occupation time #2 14-30 for the CSI report #X may be defined as "from a symbol next to the last symbol occupied by the PDCCH 14-05 including DCI indicating aperiodic CSI report #X to a start symbol of the channel non-occupancy duration (or the first symbol after determination that the channel non-occupancy duration overlaps with the PUSCH resource 14-10)". This is intended to guarantee a CPU room for performing another CSI report, by cancelling the CPU occupation of the corresponding CSI report when it is determined due to channel non-occupancy that a certain CSI report may not be performed. In another example, when the entire PUSCH resource 14-10 or a part thereof for CSI report #X transmitted in the uplink slot n' overlaps with a channel non-occupancy duration 14-15 due to the channel access procedure, CPU occupation time #3 14-40 for the CSI report #X may be defined as "from a symbol next to the last symbol occupied by the PDCCH 14-05 including DCI indicating aperiodic CSI report #X to the first symbol of the PUSCH resource 14-10". This is intended to guarantee a CPU room for performing another CSI report, by cancelling the CPU occupation before PUSCH transmission of the corresponding CSI report, when it is determined due to channel non-occupancy that a certain CSI report may not be performed. In another example, when the entire PUSCH resource 14-10 or a part thereof for CSI report #X transmitted in the uplink slot n' overlaps with a channel non-occupancy duration 14-15 due to the channel access procedure, CPU occupation time #4 14-50 for the CSI report #X may be defined as cancelling the entire existing CPU occupation 14-20. This is intended to guarantee a CPU room for performing another CSI report, by releasing the entire CPU occupation period of the corresponding CSI report, when it is determined due to channel non-occupancy that certain CSI reporting may not be performed.

Method 3) Method 3 is a method for calculating a CPU occupation time for a case where a part of an uplink resource for a periodic or semi-persistent CSI report in which reportQuantity is not set to 'none' overlaps with the channel non-occupancy duration. Method 3 is similar in a detailed method thereof with Method 2, but as the start point of the CPU occupation, "the last symbol occupied by the PDCCH including the DCI indicating aperiodic CSI report #X" may be replaced with "the first symbol of the first transmitted CSI-RS/CSI-IM/SSB resource corresponding to the last CSI-RS/CSI-IM/SSB occasion 15-10 among CSI-RS/CSI-IM/SSB occasions for CSI report #X". To avoid obscuring the subject matter of the description, a detailed example of all methods will be omitted.

Figure 15:
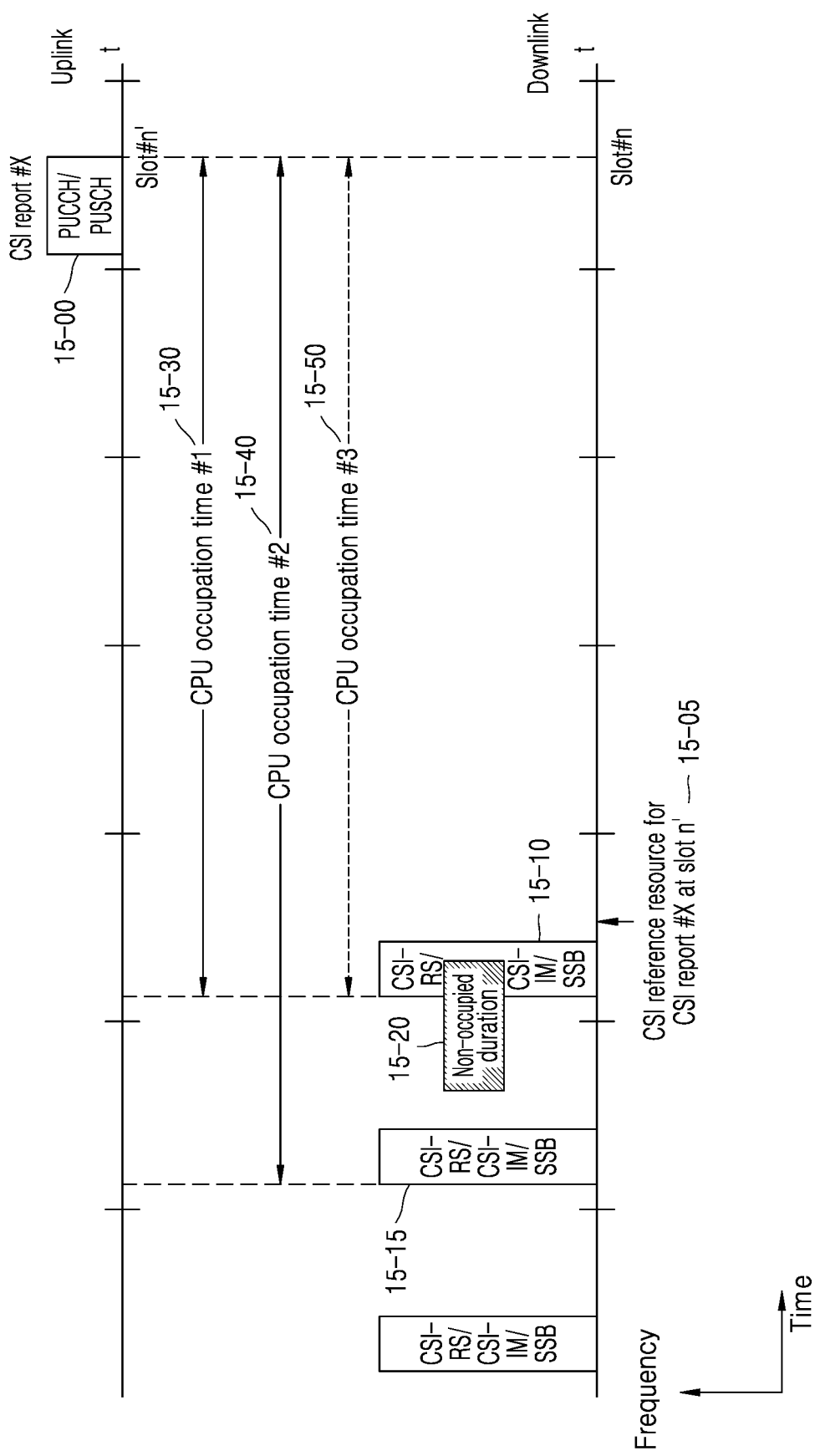
FIG. 15 illustrates another example of CPU occupation computation according to some embodiments of the disclosure.

FIG. 15 illustrates another example of CPU occupation calculation according to some embodiments of the disclosure.

Referring to FIG. 15, a CPU occupation time for a periodic or semi-persistent CSI report in which a report quantity included in the CSI report is not set to 'none' may be determined. When the base station indicates transmission of periodic or semi-persistent CSI report #X 15-00 in the uplink slot n' through higher layer signaling or DCI using DCI format 0_1 scrambled by SP-CSI-RNTI, one of the following various CPU occupation time calculation methods may be applied according to whether an uplink/downlink in which a PUSCH or CSI-RS/CSI-IM related to the CSI report #X is a licensed band or an unlicensed band or whether channel occupancy is possible at all times or conditional channel occupancy is possible (i.e., when a certain frequency/time resource may be a channel occupancy duration and a channel non-occupancy duration).

Method 4) When channel occupancy for the uplink/downlink is possible at all times in the licensed band, a CPU occupation time 15-30 for CSI report #X transmitted in the uplink slot n' may be defined as "from the first symbol of the first transmitted CSI-RS/CSI-IM/SSB resource 15-10 corresponding to the last CSI-RS/CSI-IM/SSB occasion among CSI-RS/CS-IM/SSB occasions for the CSI report #X transmitted in the uplink slot n' to the last symbol occupied by a PUCCH or PUSCH 15-00 including the CSI report #X transmitted in the uplink slot n'".

In the following description of the disclosure, for convenience of a description, "the first transmitted CSI-RS/CSI-IM/SSB resource corresponding to the last CSI-RS/CSI-IM/SSB occasion among CSI-RS/CS-IM/SSB occasions for the CSI report #X" will be described as "the latest CSI-RS/CSI-IM/SSB resource for CSI report #X". Exceptionally, when the base station indicates a semi-persistent CSI report through DCI such that the terminal performs the first CSI report of semi-persistent CSI report #X, a CPU occupation time for the first CSI report may be defined "from a symbol next to the last symbol occupied by a PDCCH including DCI indicating the semi-persistent CSI report #X to the last symbol occupied by a PUSCH including the first CSI report". In this way, time-domain operation causality of the terminal may be guaranteed based on a point in time at which a CSI report starts and a point in time at which a CPU occupation time starts.

Method 5) Method 5 is a method for calculating a CPU occupation time for a case where some of CSI-RS/CSI-IM resources for a periodic or semi-persistent CSI report in which reportQuantity is not set to 'none' overlap with the channel non-occupancy duration. When some or all of "the latest CSI-RS/CSI-IM/SSB resources 15-10 for CSI report #X" overlap with the channel non-occupancy duration 15-20 due to the channel access procedure, CPU occupation time #2 15-40 for CSI report #X may be defined as "from the first symbol of "the latest CSI-RS/CSI-IM/SSB resource 15-20 before the channel non-occupancy duration for CSI report #X" to the last symbol occupied by the PUCCH or PUSCH 15-00 including CSI report #X transmitted in the uplink slot n". This is intended to secure a room for CPU occupancy of the terminal, considering that when RS transmission/reception for a CSI report are not performed due to channel non-occupancy, a CSI report needs to be performed with reference to an RS transmitted before the RS. In another example, when all or some of "the latest CSI-RS/CSI-IM/SSB resources 15-10 for CSI report #X" overlap with the channel non-occupancy duration 15-20 due to the channel access procedure, CPU occupation time #3 15-50 for the CSI report #X may be defined as cancelling the entire existing CPU occupation 15-30. In this way, considering that when RS transmission/reception for a CSI report are not performed due to channel non-occupancy, the CSI report needs to be performed with reference to an RS transmitted before the RS, it may be taken into consideration that CSI generation based on the previously transmitted RS has been completed.

When the CSI report is performed, i.e., multiple NZP CSI-RS resources or CSI-IM resources are configured in one resource setting, one NZP CSI-RS resource may be used for CSI calculation by being paired with one CSI-IM resource. That is, when a total of N CSI-RS resources are configured in a certain resource setting and a total of N CSI-IM resources are configured in another resource setting such that CRI may indicate one of 0 through (N−1), CRI=0 may mean that the first CSI-IM resource among CSI-RS and CSI-IM resources configured in the resource setting for corresponding CSI calculation and channel and interference measurement from the first CSI-RS resource are used, and CRI=N−1 may mean that an $(N-1)^{th}$ CSI-IM resource among CSI-RS and CSI-IM resources configured in the resource setting for corresponding CSI calculation and channel and interference measurement from the $(N-1)^{th}$ CSI-RS resource are used. When one CSI-RS resource or CSI-IM resource among the $n^{th}$ {CSI-RS resource, CSI-IM resource} pair overlaps with the channel non-occupancy duration, the terminal may assume that the other resources that do not overlap with the channel non-occupation duration overlap with the channel non-occupancy duration. This may mean that when at least one resource among a CSI-RS resource or a CSI-IM resource indicated by a certain CRI value overlaps with the channel non-occupancy duration, the terminal is not to report the CRI value to the base station.

Meanwhile, a time in which overlapping of the channel non-occupancy duration with the PUSCH resource is fixed may be the first symbol after a minimum processing time required for the terminal to obtain channel occupancy time information by processing DCI immediately after the last symbol occupied by the PDCCH including the DCI including at least channel occupancy duration information from the base station. In the description of the disclosure, when the "terminal is guaranteed with Condition A" may be interpreted as various meanings such as "Condition A is not expected not to be satisfied", "Operation related to Condition A is not performed when Condition A is not satisfied", "Indication of the base station related to Condition A is ignored when Condition A is not satisfied", etc. In addition, not to obscure the subject matter of the description, the foregoing description will not be repeated.

Third Embodiment: Method of Determining CSI-RS Active Duration According to Channel Occupancy or Channel Non-Occupancy The third embodiment of the disclosure may provide a method of determining a CSI-RS active duration according to channel occupancy or channel non-occupancy.

The following active duration may be defined for an NZP CSI-RS resource (or a CSI-IM resource or SSB). The terminal may be guaranteed not to measure active CSI-RS ports or active CSI-RS resources of a number greater than a value reported through terminal (UE) capability signaling in a certain slot. When one CSI-RS resource is referred to by N CSI reporting settings (that is, one CSI-RS resource involves generation of N CSI), the CSI-RS resource may be counted as N active CSI-RS resources. An active duration of a CSI-RS resource or port may be defined differently according to a time domain behavior of CSI-RS. For aperiodic CSI-RS, an active duration may be defined as from "a symbol in which a triggering PDCCH ends to a time at which PUSCH transmission including a related CSI report ends". For semi-persistent (Sp) CSI-RS, an active duration may be defined as "from a time at which an activation command of the Sp CSI-RS is applied (for MAC CE-based activation, a time after 3 ms from a time at which HARQ-ACK for the MAC CE is reported and for DCI-based activation, a time at which the last symbol of a PDCCH including the DCI ends) to a time (the same as the above) at which a deactivation command of the Sp CSI-RS is applied". For periodic (P) CSI-RS, an active duration may be defined as "from a time at which the P CSI-RS is configured through a higher layer to a time at which higher layer configuration of the P CSI-RS is released". The active duration of the SSB may refer to the definition of an active duration for P CSI-RS.

Meanwhile, based on transmission or non-transmission of an RS due to the channel occupancy duration or the channel non-occupancy duration, an active duration for the CSI-RS (or CSI-IM or SSB) resource and port may be modified by referring to one of the following methods:

Method 1) According to the first method, when certain Sp or P CSI-RS resources overlap with the channel non-occupancy duration, the Sp or P CSI-RS port or resources may not be considered as active CSI-RS port or resources from a time at which the channel non-occupancy duration starts (or ends) to the earliest transmission time among the Sp or P CSI-RS resources transmitted after the channel non-occupancy duration. It may be understood that when a certain Sp or P CSI-RS resource fails to be transmitted due to channel non-occupancy, an active duration for CSI-RS resources or ports transmitted in the resource is cancelled until next transmission. In this case, advantageously, in case of occurrence of the channel non-occupancy duration at the Sp or P CSI-RS transmission time, additional Ap CSI-RS transmission may be performed without waiting for a next transmission time of the Sp or P CSI-RS. The time at which cancellation for the activation duration of the Sp or P CSI-RS ends may extend to a PUSCH transmission end time for a CSI report based on additional Ap CSI-RS transmission, when the additional Ap CSI-RS transmission occurs before the next transmission time of Sp or P CSI-RS. That is, "the time at which cancellation for the activation duration of the Sp or P CSI-RS ends" may be a time coming later between "the next transmission time of Sp or P CSI-RS" and "the PUSCH transmission end time for CSI report based on the additional Ap CSI-RS transmission". In this way, the terminal and the base station may not infringe a terminal capability report value for maximum CSI-RS ports or active CSI-RS resources due to the additional Ap CSI-RS transmission.

Method 2) The second method does not consider Ap CSI-RS ports or resources in an overlapping duration as active CSI-RS ports or resources when certain AP CSI-RS overlaps with the channel non-occupancy duration. In this case, "a time at which Ap CSI-RS ports or resources overlapping with the channel non-occupancy duration are not considered as active CSI-RS ports or resources" may be agreed as a start symbol of the channel non-occupancy duration, or in another example, as a later time between a time at which a start point of the channel non-occupancy duration is known and the last symbol of the PDCCH including triggering DCI of the Ap CSI-RS. By using the second method, the base station and the terminal may secure a room for performing another CSI report by avoiding maintaining an Ap CSI-RS active duration for an invalid CSI report.

According to Methods 1 and 2, the terminal may ignore, skip, or do not update a CSI report referring to CSI-RS that is not the active CSI-RS. In this way, the flexibility of CSI report setting or trigger may be improved and the efficiency of data transmission may be enhanced.

Figure 16:
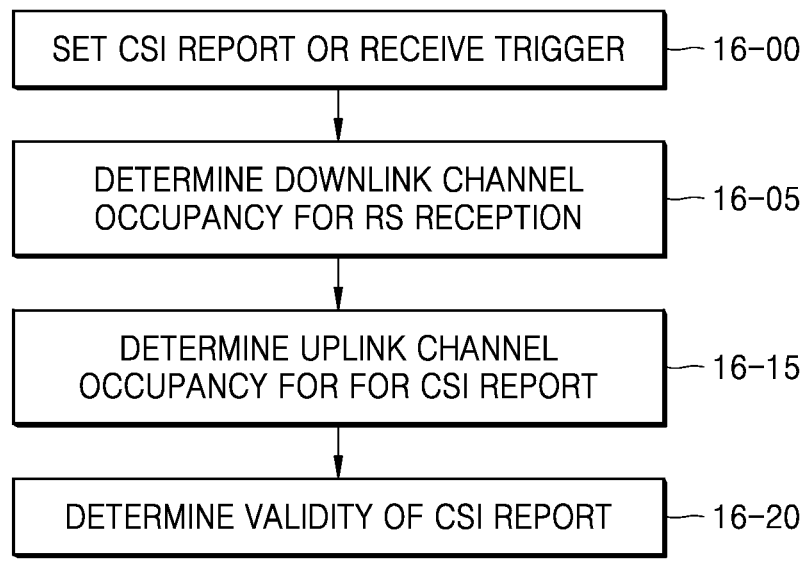
FIG. 16 illustrates a flowchart of an operation order of a base station and a terminal, according to some embodiments of the disclosure.

FIG. 16 illustrates a flowchart of an operation order of a base station and a terminal, according to some embodiments of the disclosure.

Referring to FIG. 16, the base station may notify the terminal of CSI report-related configurations or indicate or trigger an aperiodic/semi-persistent CSI report based on the configurations, in operation 16-00. Thereafter, the base station and the terminal may determine whether a downlink channel for receiving an RS signal is occupied, by using at least one of the methods according to the first through third embodiments of the disclosure, in operation 16-05. The base station and the terminal may then determine whether an uplink channel for a CSI report is occupied, by using at least one of the methods according to the first through third embodiments of the disclosure, in operation 16-15. The base station and the terminal may determine validity of the CSI report by using at least one of the methods according to the first through third embodiments of the disclosure and execute a CSI report accordingly, in operation 16-20.

Figure 17:
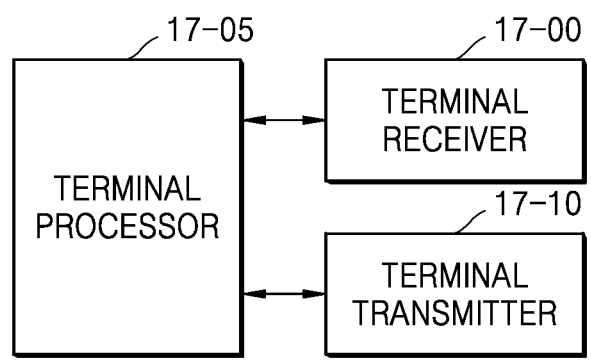
FIG. 17 illustrates a block diagram illustrating a configuration of a terminal according to some embodiments of the disclosure.

FIG. 17 illustrates a block diagram illustrating a configuration of a terminal according to some embodiments of the disclosure.

Referring to FIG. 17, a terminal may include a terminal receiver 17-00, a terminal transmitter 17-10, and a terminal processor 17-05. The terminal receiver 17-00 and the terminal transmitter 17-10 may be collectively referred to as a transceiver. According to the above-described communication method of the terminal, the terminal receiver 17-00, the terminal transmitter 17-10, and the terminal processor 17-05 of the terminal may operate. However, components of the terminal are not limited to the above-described example. For example, the terminal may include more components (e.g., a memory, etc.) or fewer components than the above-described components. Moreover, the terminal receiver 17-00, the terminal transmitter 17-10, and the terminal processor 17-05 may be implemented in a single chip form.

The terminal receiver 17-00 and the terminal transmitter 17-10 (or transceiver) may transmit and receive a signal to and from the base station. The signal may include control information and data. To this end, the transceiver may include an RF transmitter that up-converts and amplifies a frequency of a transmission signal and an RF receiver that low-noise-amplifies a received signal and down-converts a frequency. However, this is merely an example of the transceiver, components of which are not limited to the RF transmitter and the RF receiver.

The transceiver may receive a signal through a radio channel and output the received signal to the terminal processor 17-05, and transmit a signal output from the terminal processor 17-05 through the radio channel.

The memory (not shown) may store programs and data required for an operation of the terminal. The memory may also store control information or data included in a signal obtained by the terminal. The memory may include a storage medium such as ROM, RAM, hard-disk, CD-ROM, DVD, etc., or a combination of storage media.

The terminal processor may control a series of processes such that the terminal operates according to the above-described embodiment of the disclosure. The terminal processor 17-05 may be implemented as a controller or one or more processors.

Figure 18:
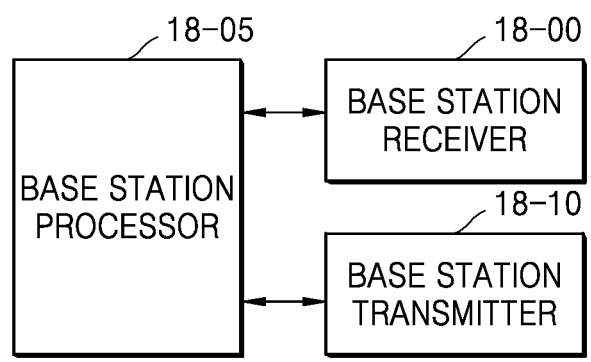
FIG. 18 is a block diagram illustrating a configuration of a base station according to some embodiments of the disclosure.

FIG. 18 illustrates a block diagram illustrating a configuration of a base station according to some embodiments of the disclosure.

Referring to FIG. 18, the base station may include a base station receiver 18-00, a base station transmitter 18-10, and a base station processor 18-05. The base station receiver 18-00 and the base station transmitter 18-10 will be collectively referred to as a transceiver. According to the above-described communication method of the base station, the base station receiver 18-00, the base station transmitter 18-10, and the base station processor 18-05 of the base station may operate. However, components of the base station are not limited to the above-described example. For example, the base station may include more components (e.g., a memory, etc.) or fewer components than the above-described components. Moreover, the base station receiver 18-00, the base station transmitter 18-10, and the base station processor 18-05 may be implemented in the form of a single chip.

The base station receiver 18-00 and the base station transmitter 18-10 (or transceiver) may transmit and receive a signal to and from the terminal. Herein, the signal may include control information and data. To this end, the transceiver may include an RF transmitter that up-converts and amplifies a frequency of a transmission signal and an RF receiver that low-noise-amplifies a received signal and down-converts a frequency. However, this is merely an example of the transceiver, components of which are not limited to the RF transmitter and the RF receiver.

The transceiver may receive a signal through a radio channel and output the received signal to the base station processor 18-05, and transmit a signal output from the base station processor 18-05 through the radio channel.

The memory (not shown) may store programs and data required for an operation of the base station. The memory may also store control information or data included in a signal obtained by the base station. The memory may include a storage medium such as ROM, RAM, hard-disk, CD-ROM, DVD, etc., or a combination of storage media.

The base station processor 18-05 may control a series of processes such that the base station operates according to the above-described embodiment of the disclosure. The base station processor 18-05 may be implemented as a controller or one or more processors.

Disclosed embodiments of the disclosure may provide an apparatus and method for effectively saving a power of the terminal in a wireless communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station (BS), channel state information (CSI) resource configuration information, CSI report configuration information, and information associated with channel occupancy duration;
   performing a channel state information Reference Signal (CSI-RS) reception based on the CSI report configuration information;
   identifying whether a downlink resource for the CSI-RS reception is valid or not based on the information associated with the channel occupancy duration;
   in case that the downlink resource for the CSI-RS reception is not valid, cancelling the CSI-RS reception within the downlink resource; and
   in case that the downlink resource for the CSI-RS reception is valid, receiving a CSI-RS for transmitting a CSI report, and transmitting, to the base station, the CSI report based on the received CSI-RS.

2. The method of claim 1,
   wherein the downlink resource for the CSI-RS reception is not valid in case that the downlink resource for the CSI-RS reception is not within a channel occupancy duration.

3. The method of claim 1, further comprising:
   receiving, from the BS, slot format indication information,
   wherein a valid downlink resource for the CSI-RS reception includes a downlink symbol or a flexible symbol indicated by the slot format indication information.

4. The method of claim 1,
   wherein slot format indication information associated with the downlink resource is not provided to the terminal.

5. The method of claim 1, further comprising:
   determining a CSI processing unit (CPU) occupation time regardless of the channel occupancy duration,
   wherein the CSI report is transmitted based on the determined CPU occupation time.

6. A method performed by a base station in a wireless communication system, the method comprising:
   transmitting, to a terminal, channel state information (CSI) resource configuration information for configuring the terminal to perform a channel state information Reference Signal (CSI-RS) reception, CSI report configuration information, and information associated with channel occupancy duration;
   transmitting, to the terminal, one or more channel state information reference signals (CSI-RSs) based on the CSI report configuration information; and
   receiving, from the terminal, a CSI report based on at least one valid CSI-RS from the one OF more CSI-RSs,
   wherein the at least one valid CSI-RS is determined based on the information associated with the channel occupancy duration.

7. The method of claim 6,
   wherein a CSI-RS is not valid in case that a downlink resource for the CSI-RS reception is not within a channel occupancy duration.

8. The method of claim 6, further comprising:
   transmitting, to the terminal, slot format indication information,
   wherein at least one downlink resource for the at least one valid CSI-RS includes a downlink symbol or a flexible symbol indicated by the slot format indication information.

9. The method of claim 6,
   wherein slot format indication information associated with a downlink resource for the one or more CSI-RSs is not provided to the terminal.

10. The method of claim 6,
    wherein a CSI processing unit (CPU) occupation time is determined regardless of the channel occupancy duration by the terminal; and
    wherein the CSI report is transmitted based on the determined CPU occupation time.

11. A terminal in a wireless communication system, the terminal comprising:
a transceiver; and
at least one processor coupled with the transceiver and configured to:
receive, from a base station (BS), channel state information (CSI) resource configuration information, CSI report configuration information, and information associated with channel occupancy duration,
perform a channel state information Reference Signal (CSI-RS) reception based on the CSI report configuration information,
identify whether a downlink resource for a CSI-RS is valid or not based on the information associated with the channel occupancy duration,
in case that the downlink resource for the CSI-RS reception is not valid, cancel the CSI-RS reception within the downlink resource, and
in case that the downlink resource for the CSI-RS reception is valid, receiving a CSI-RS for transmitting a CSI report, and transmitting, to the base station, the CSI report based on the received CSI-RS.

12. The terminal of claim 11,
wherein the downlink resource for the CSI-RS reception is not valid in case that the downlink resource for the CSI-RS reception is not within a channel occupancy duration.

13. The terminal of claim 11, wherein the at least one processor is further configured to:
receive, from the BS, slot format indication information,
wherein a valid downlink resource for the CSI-RS reception includes a downlink symbol or a flexible symbol indicated by the slot format indication information.

14. The terminal of claim 11,
wherein slot format indication information associated with the downlink resource is not provided to the terminal.

15. The terminal of claim 11, wherein the at least one processor is further configured to:
determine a CSI processing unit (CPU) occupation time regardless of the channel occupancy duration,
wherein the CSI report is transmitted based on the determined CPU occupation time.

16. A base station (BS) in a wireless communication system, the base station comprising:
a transceiver; and
at least one processor coupled with the transceiver and configured to:
transmit, to a terminal, channel state information (CSI) resource configuration information for configuring the terminal to perform a channel state information Reference Signal (CSI-RS) reception, CSI report configuration information, and information associated with channel occupancy duration,
transmit, to the terminal, one or more channel state information reference signals (CSI-RSs) based on the CSI report configuration information, and
receive, from the terminal, a CSI report based on at least one valid CSI-RS from the one or more CSI-RSs,
wherein the at least one valid CSI-RS is determined based on the information associated with the channel occupancy duration.

17. The BS of claim 16,
wherein a CSI-RS is not valid in case that a downlink resource for the CSI-RS reception is not within a channel occupancy duration.

18. The BS of claim 16, wherein the at least one processor is further configured to:
transmit, to the terminal, slot format indication information,
wherein at least one downlink resource for the at least one valid CSI-RS includes a downlink symbol or a flexible symbol indicated by the slot format indication information.

19. The BS of claim 16,
wherein slot format indication information associated with a downlink resource for the one OF more CSI-RSs is not provided to the terminal.

20. The BS of claim 16,
wherein a CSI processing unit (CPU) occupation time is determined regardless of the channel occupancy duration by the terminal; and
wherein the CSI report is transmitted based on the determined CPU occupation time.

* * * * *